(12) United States Patent
Daniel et al.

(10) Patent No.: US 8,067,923 B2
(45) Date of Patent: *Nov. 29, 2011

(54) RECHARGEABLE BATTERY ASSEMBLY HAVING A DATA AND POWER CONNECTOR PLUG

(75) Inventors: Simon Daniel, Rowhills (GB); Christopher Verity Wright, Stroud (GB)

(73) Assignee: Moxia Energy Holdings Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,913

(22) Filed: Nov. 2, 2009

(65) Prior Publication Data

US 2010/0052609 A1 Mar. 4, 2010

Related U.S. Application Data

(63) Continuation of application No. 12/059,590, filed on Mar. 31, 2008, now abandoned, and a continuation-in-part of application No. 11/211,934, filed on Aug. 25, 2005, now Pat. No. 7,375,494.

(30) Foreign Application Priority Data

Nov. 25, 2004 (GB) .................................. 0425967.7

(51) Int. Cl.
*H02J 7/00* (2006.01)

(52) U.S. Cl. ........ 320/112; 320/106; 320/107; 320/114; 439/131

(58) Field of Classification Search .................. 320/112; 439/131

See application file for complete search history.

(56) References Cited

U.S. PATENT DOCUMENTS 2,876,410 A 3/1959 Fry
(Continued)

FOREIGN PATENT DOCUMENTS

CA 2517333 A1 * 9/2002
(Continued)

OTHER PUBLICATIONS

Chinese Examination Report for 2005800402723 dated Nov. 11, 2005 (13 pages).

(Continued)

*Primary Examiner* — Arun Williams
(74) *Attorney, Agent, or Firm* — Conley Rose, P.C.

(57) ABSTRACT

A rechargeable battery assembly comprises a rechargeable battery unit and a data and power connector plug. The battery assembly has a deployed configuration in which the battery assembly has the general form of and functions as a conventional battery format, and a recharge configuration in which the data and power connector plug is made accessible to enable said connector to be connected to a suitable receptacle on a computing or peripheral device for recharging of the battery.

20 Claims, 21 Drawing Sheets

U.S. PATENT DOCUMENTS

| | | | |
|---|---|---|---|
| 3,665,285 A | | 5/1972 | Mullersman |
| 4,086,523 A | | 4/1978 | Izumi |
| 4,622,507 A | | 11/1986 | Persen |
| 5,449,567 A | | 9/1995 | Yeh |
| 5,538,805 A | | 7/1996 | Aragon |
| 5,691,742 A | * | 11/1997 | O'Connor et al. ............ 715/835 |
| 6,456,500 B1 | | 9/2002 | Chen |
| 6,808,400 B2 | | 10/2004 | Tu |
| 6,900,980 B2 | * | 5/2005 | Christopher ............. 361/679.31 |
| 2002/0158603 A1 | * | 10/2002 | Chang ........................... 320/107 |
| 2004/0113588 A1 | * | 6/2004 | Mikuriya et al. ............. 320/128 |
| 2004/0145890 A1 | * | 7/2004 | Liao .............................. 362/183 |
| 2004/0157119 A1 | * | 8/2004 | Muchin et al. ................ 429/149 |
| 2005/0012853 A1 | * | 1/2005 | Wang ............................ 348/376 |
| 2005/0174094 A1 | * | 8/2005 | Purdy et al. .................. 320/134 |
| 2005/0191544 A1 | * | 9/2005 | Casanova ...................... 429/100 |
| 2006/0005055 A1 | * | 1/2006 | Potega .......................... 713/300 |
| 2006/0026348 A1 | * | 2/2006 | Wallace et al. ............... 711/115 |

FOREIGN PATENT DOCUMENTS

| | | |
|---|---|---|
| CN | 2215769 Y | 12/1995 |
| EP | 1158593 A1 | 11/2001 |

OTHER PUBLICATIONS

Notification of the First Office Action by The State Intellectual Property Office of P.R. China dated Apr. 11, 2008 (4 pages).

English Translation of Chinese Examination Report for 2005800402723 (20 pages).

* cited by examiner

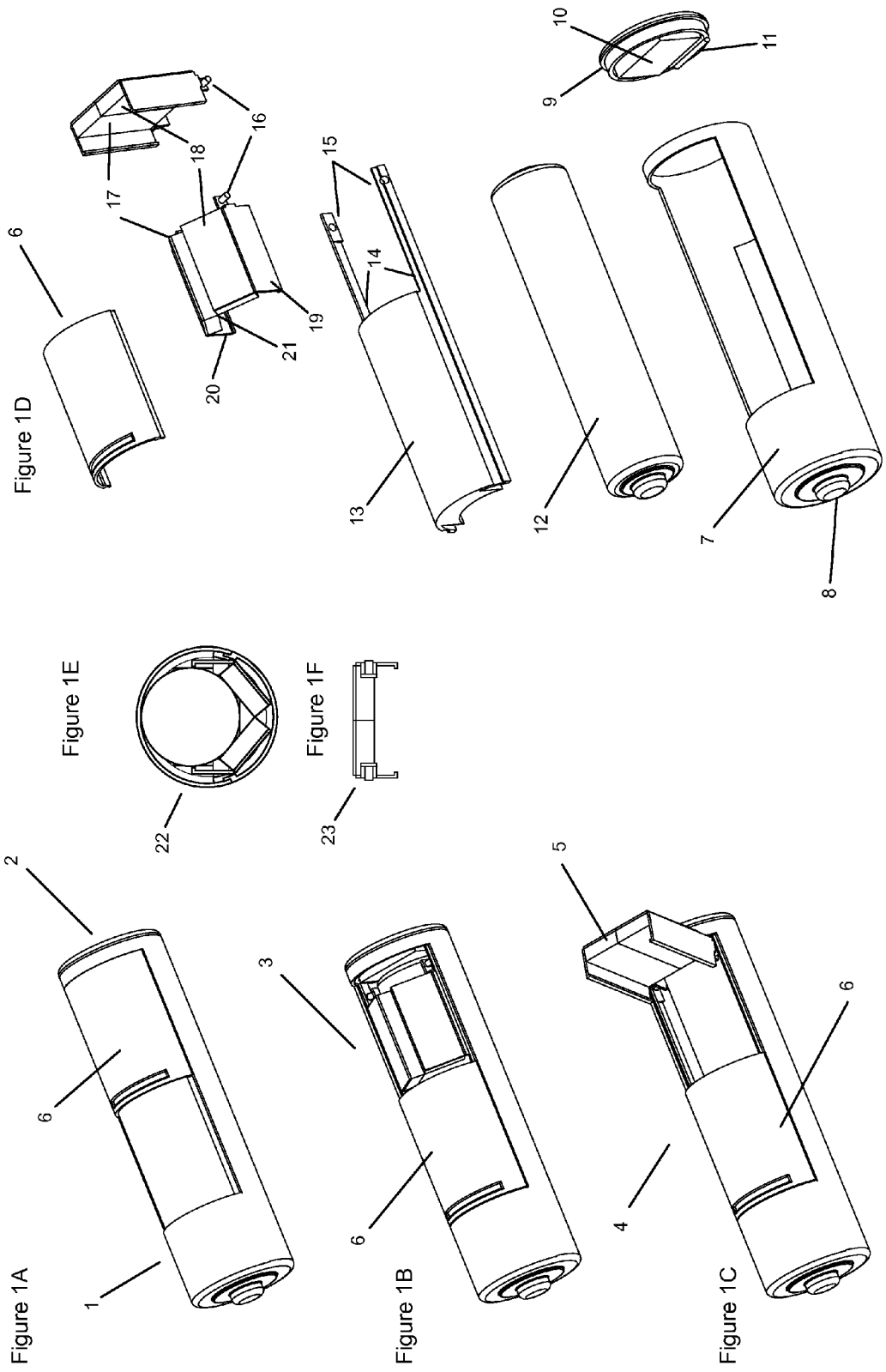

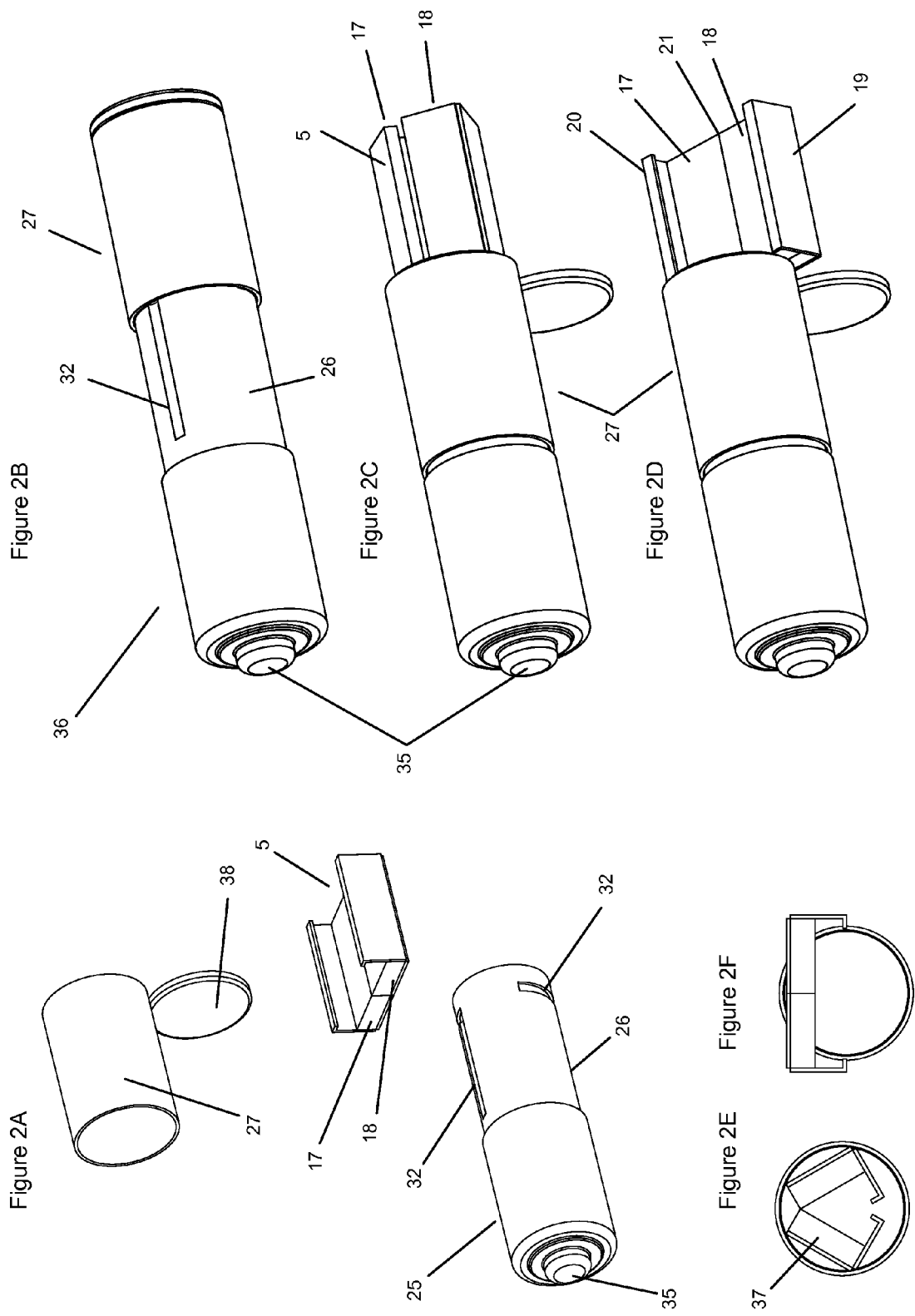

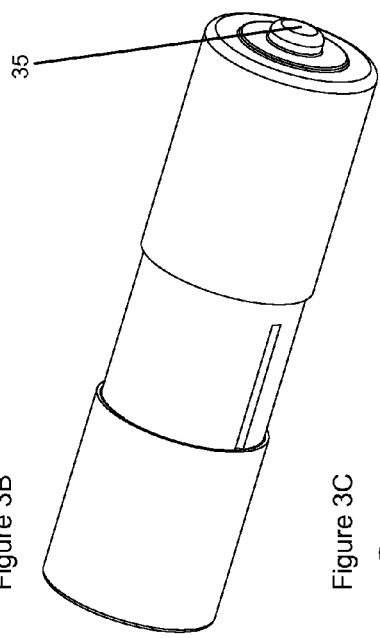
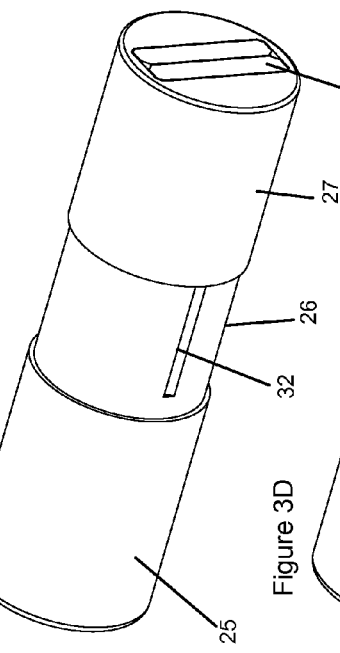
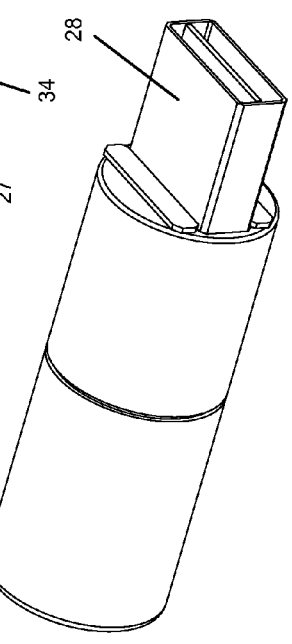
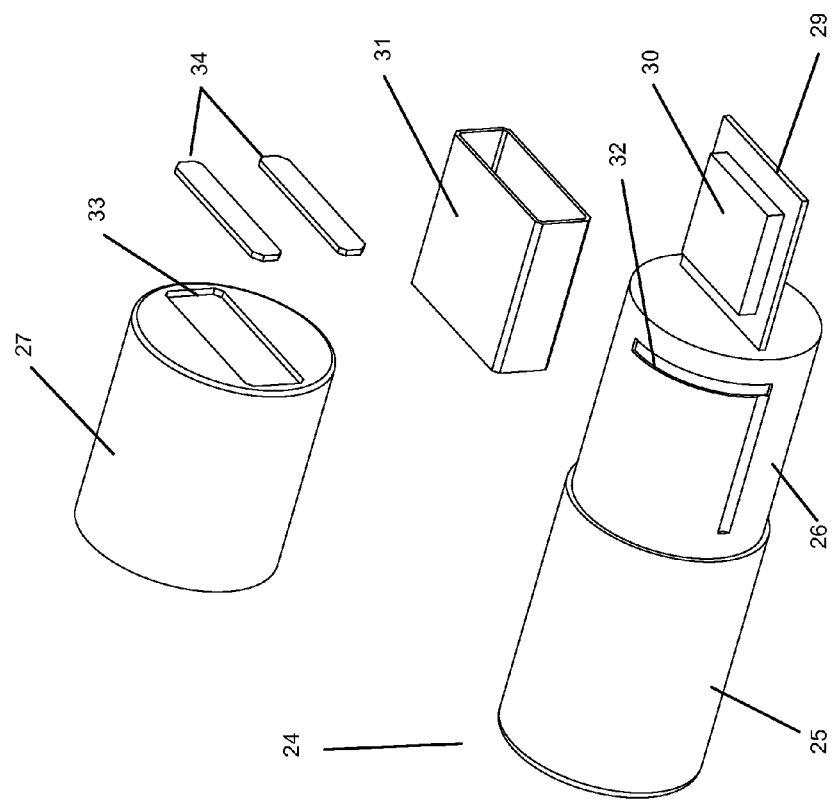

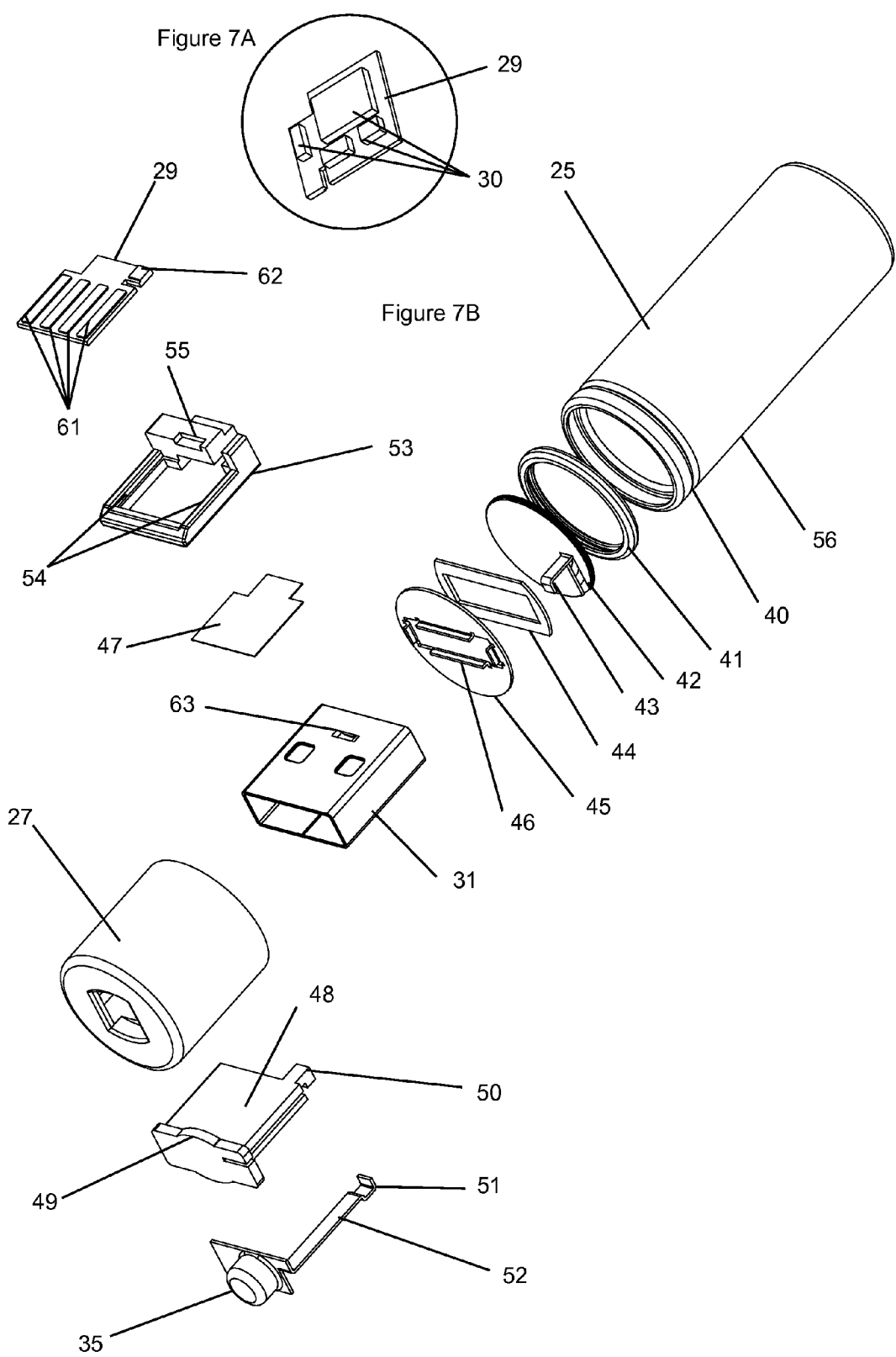

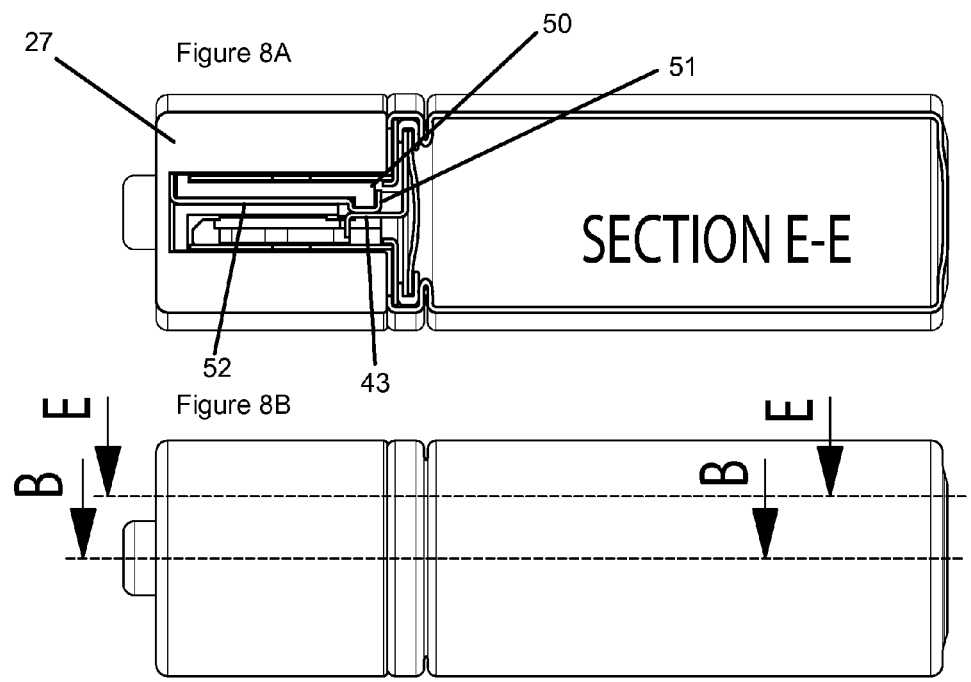
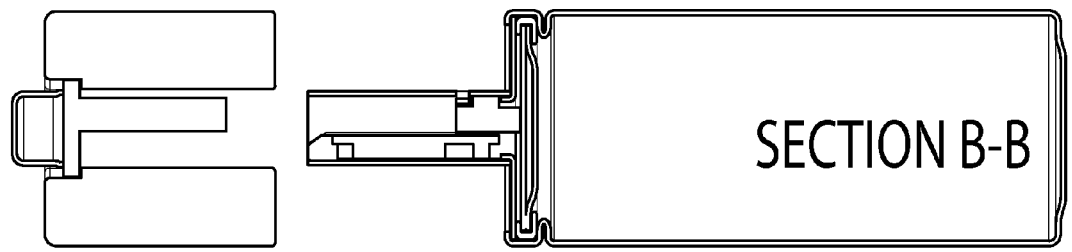
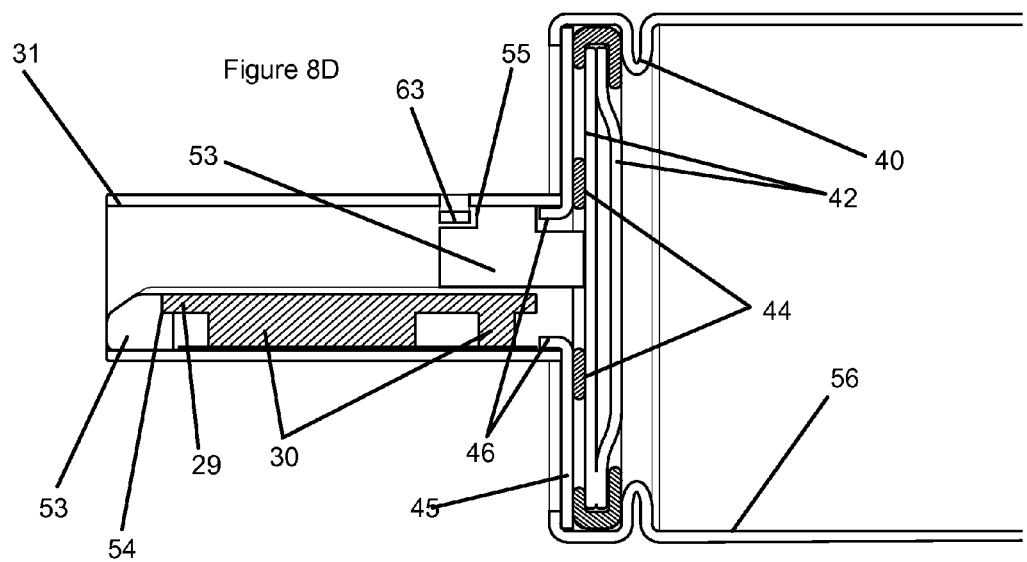

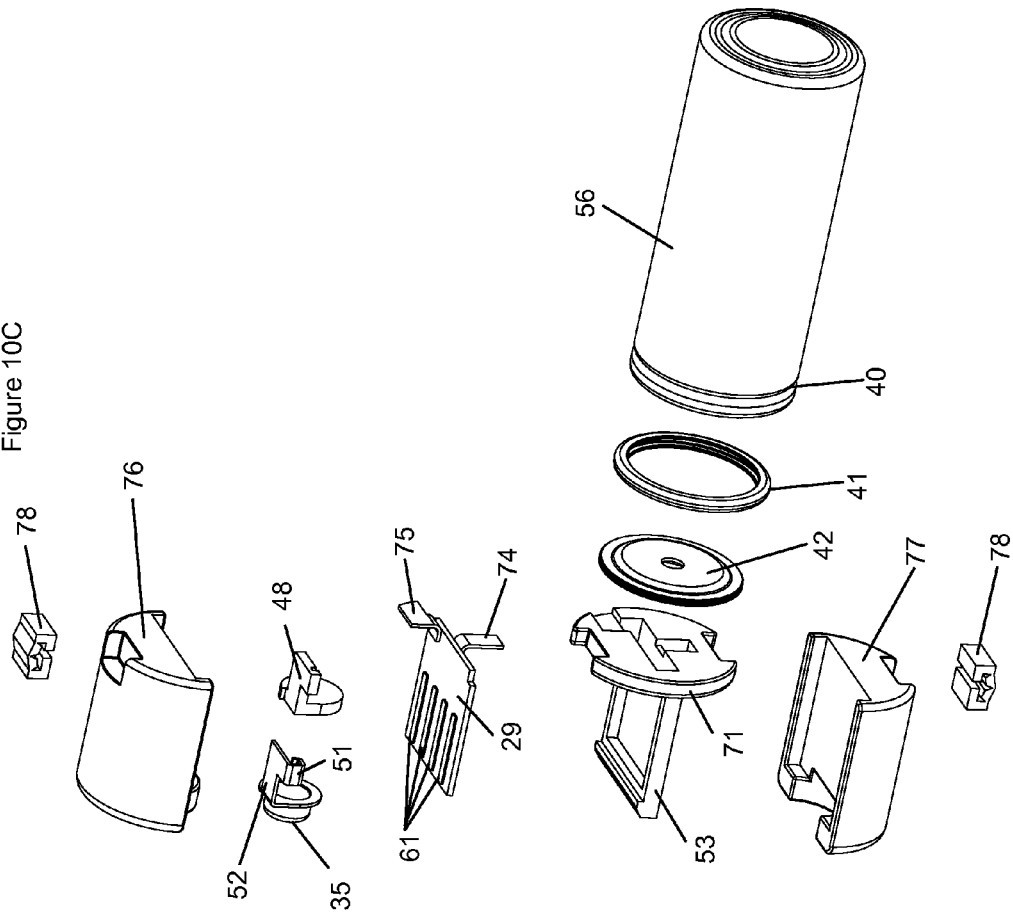
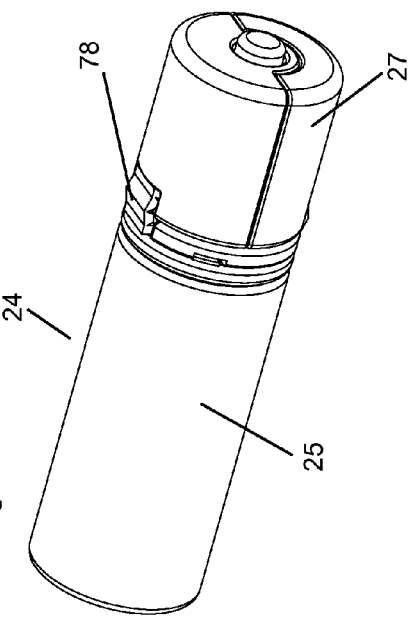
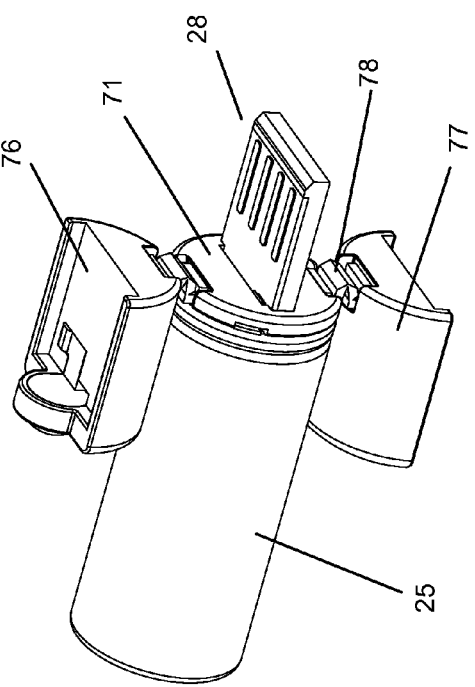

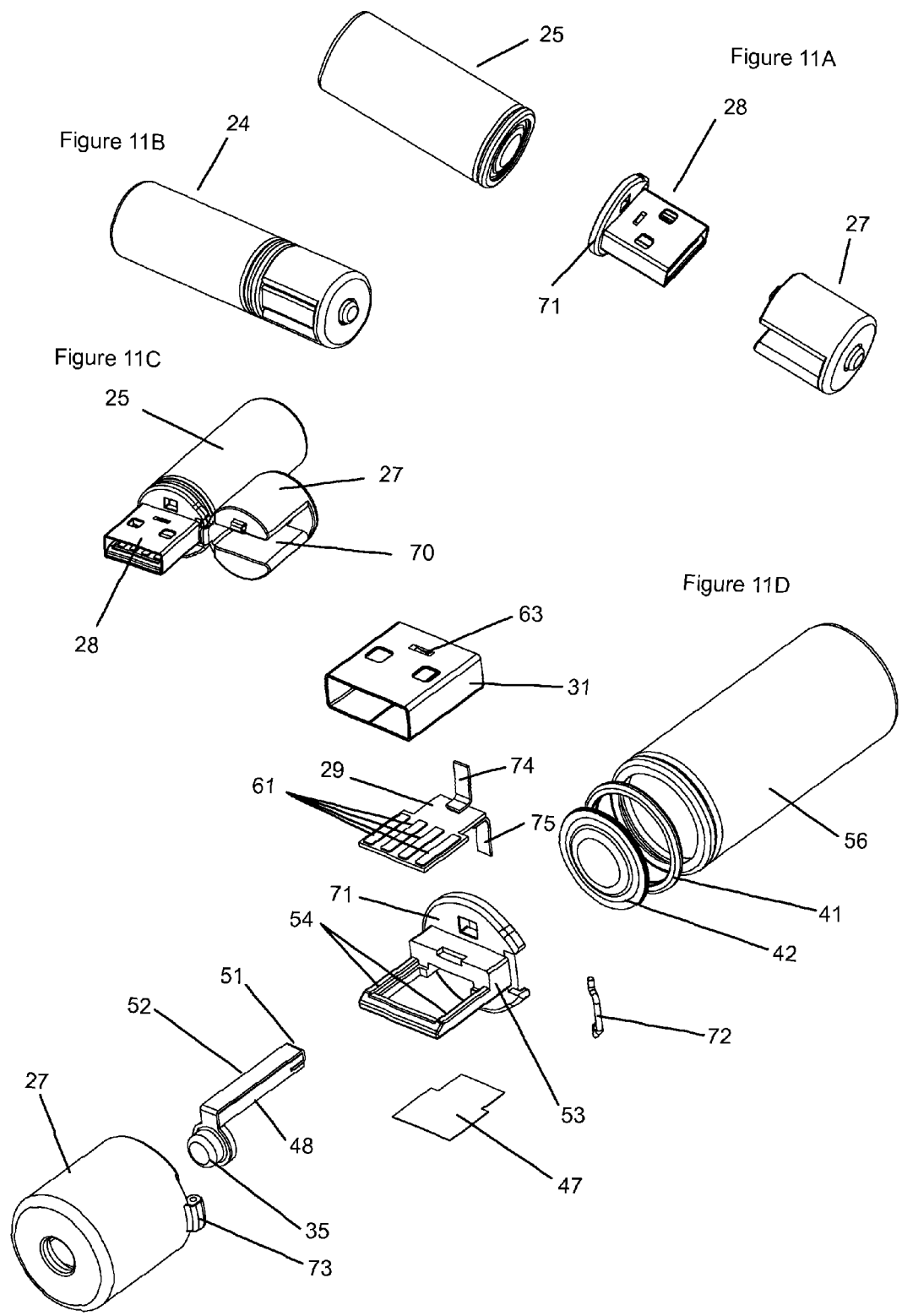

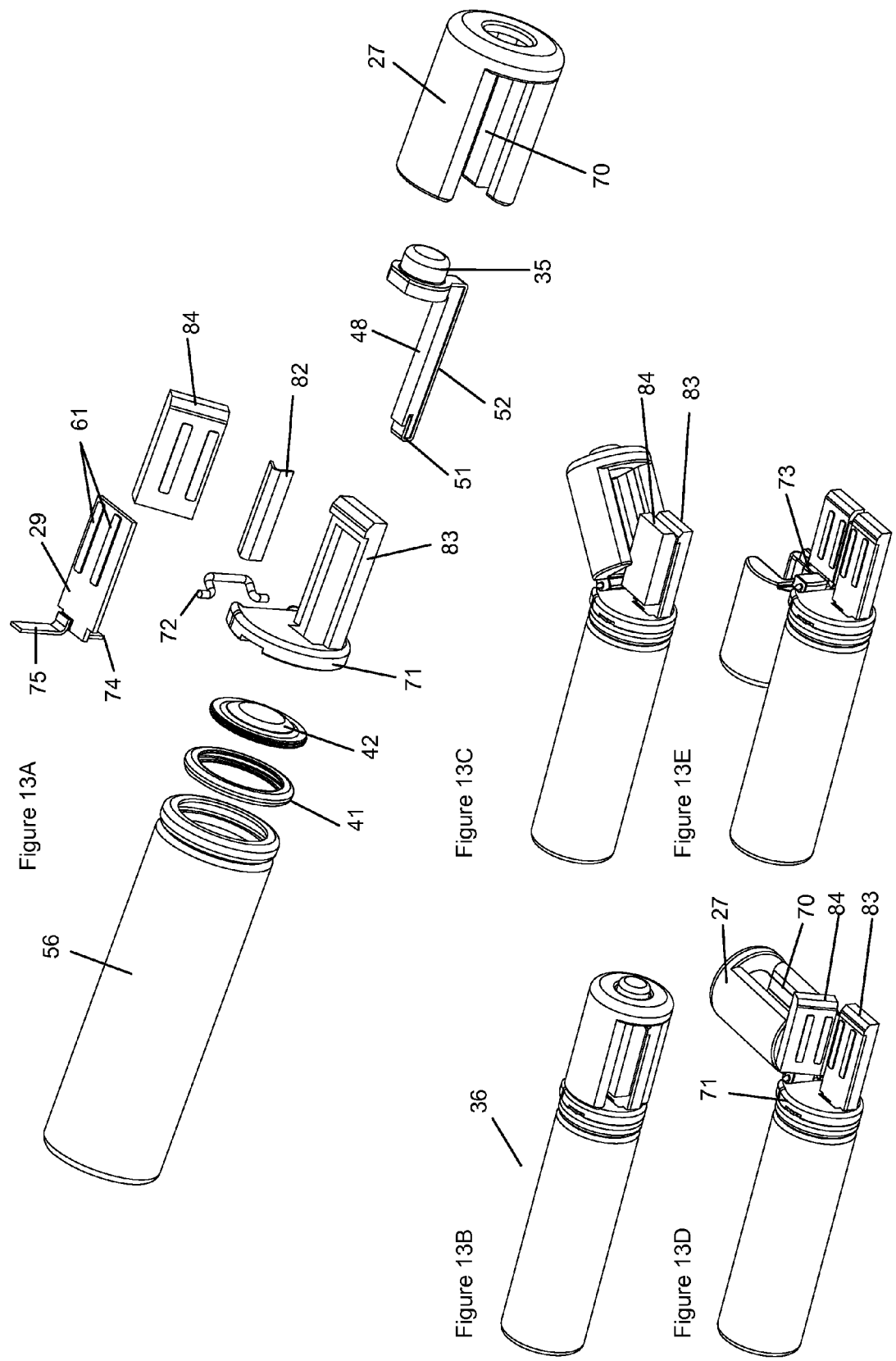

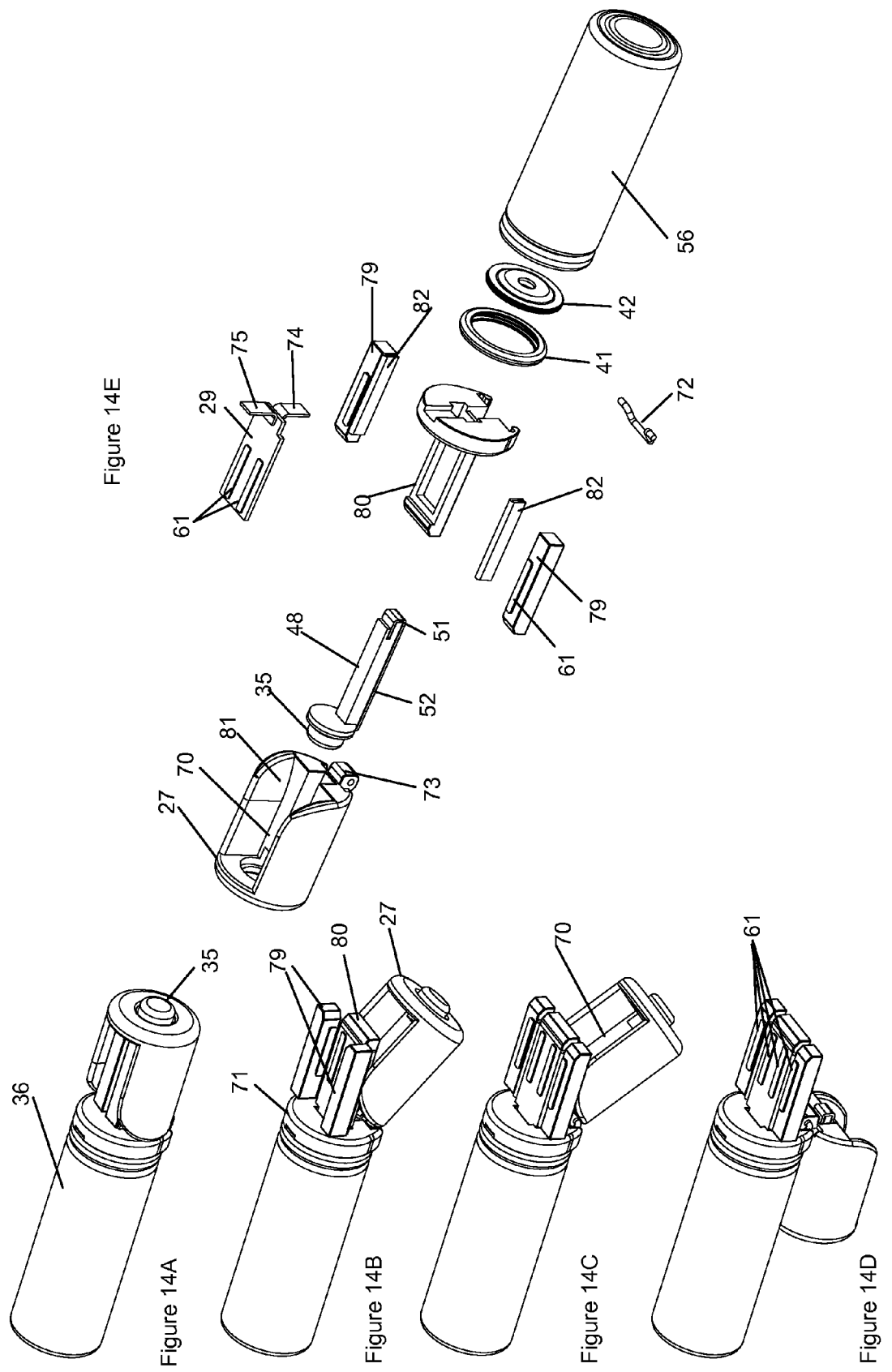

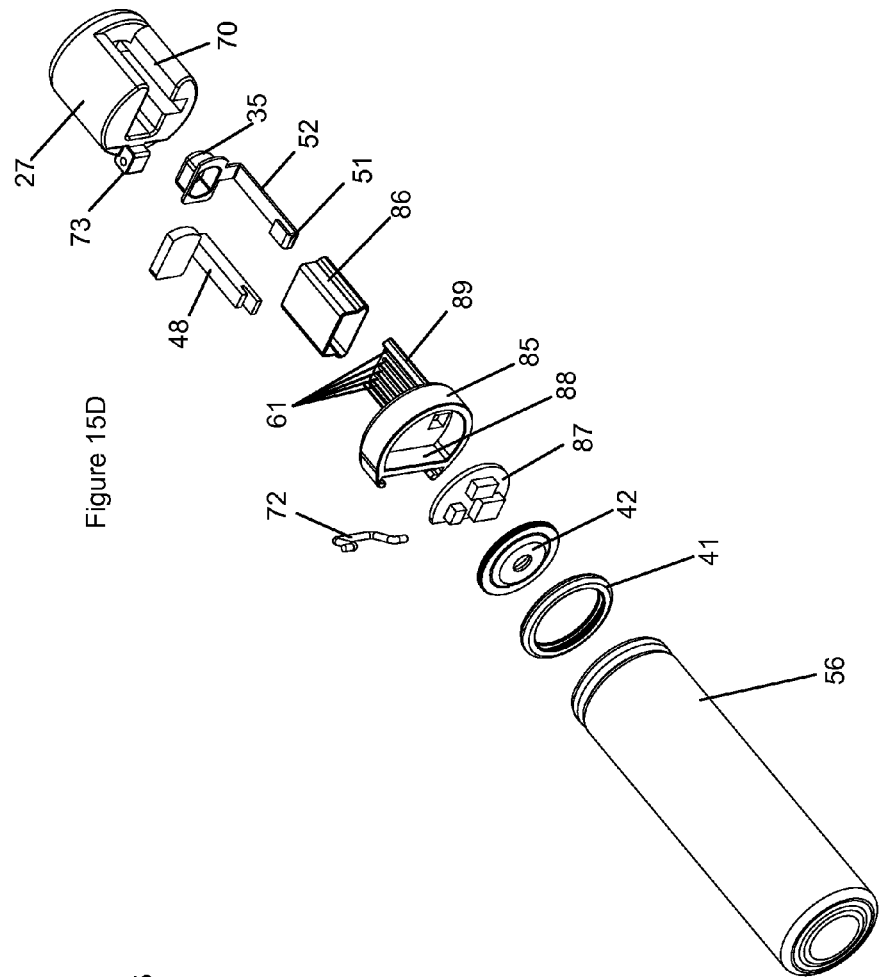
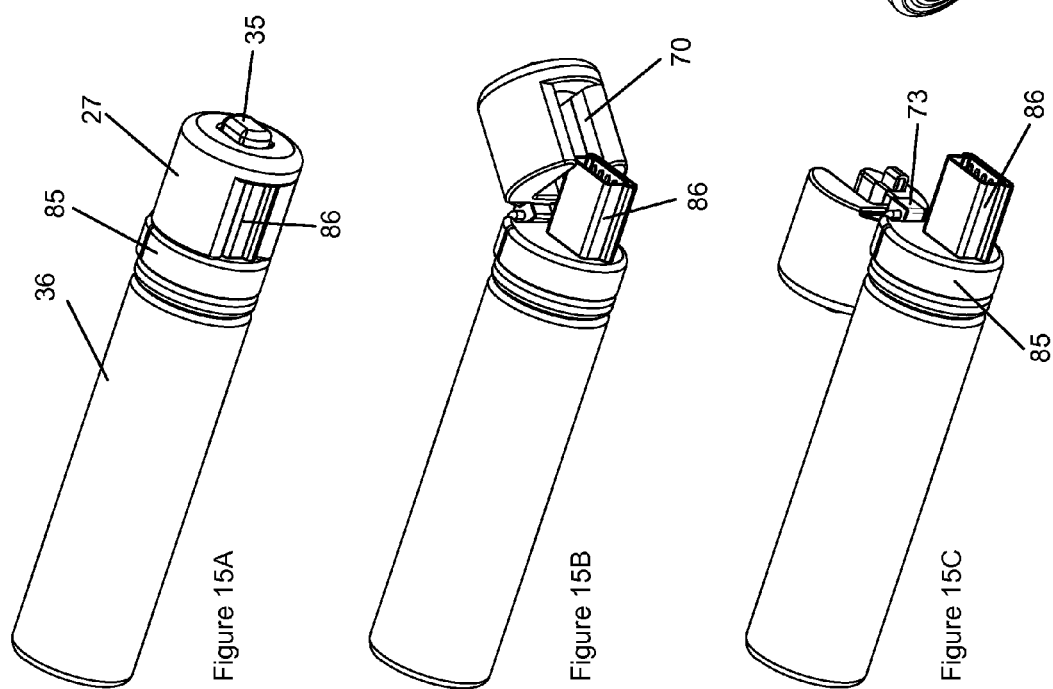
Figure 15D
Figure 15A
Figure 15B
Figure 15C

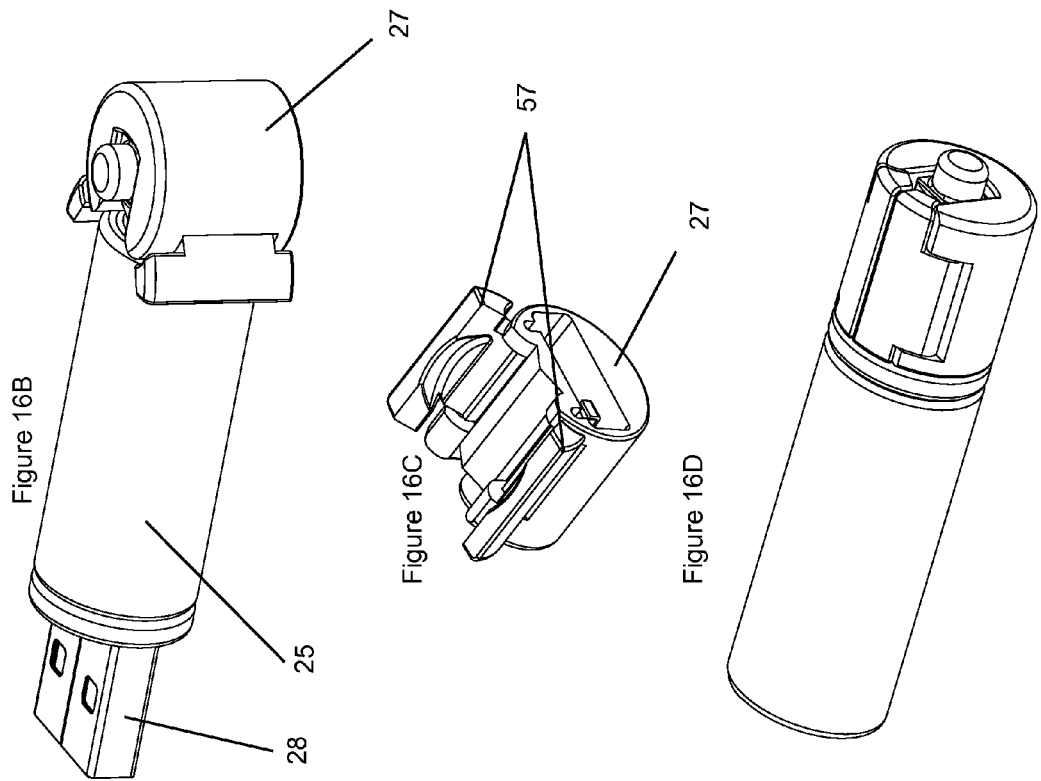
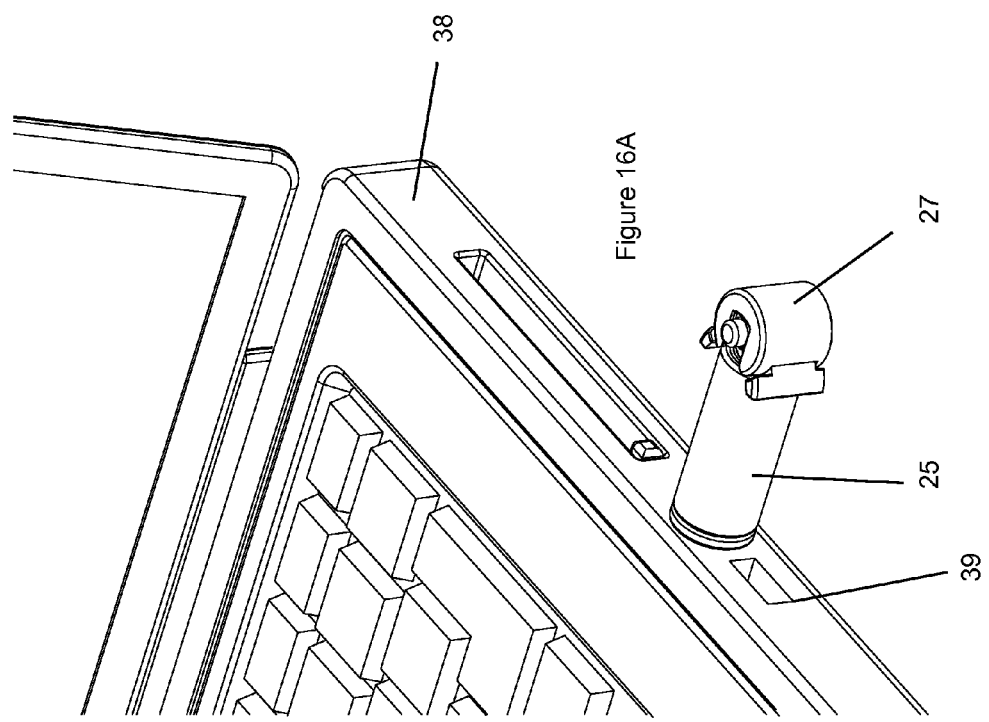

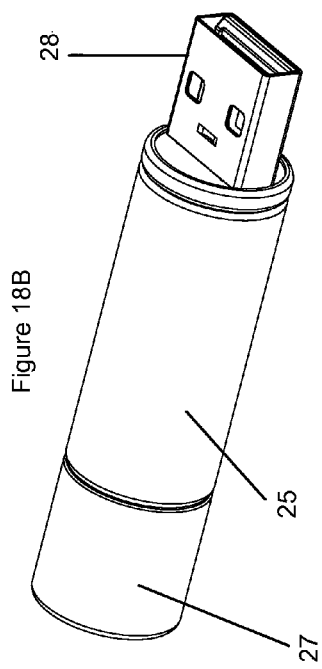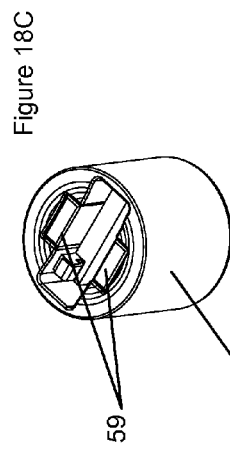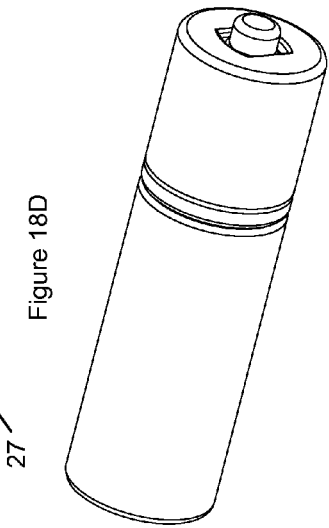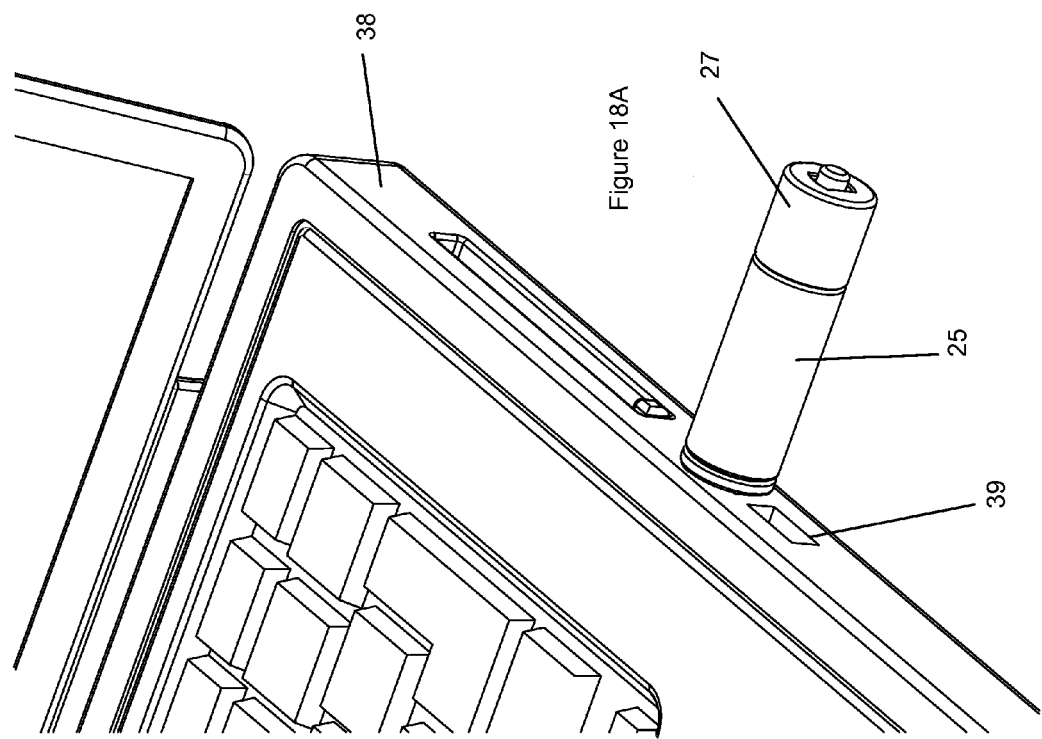

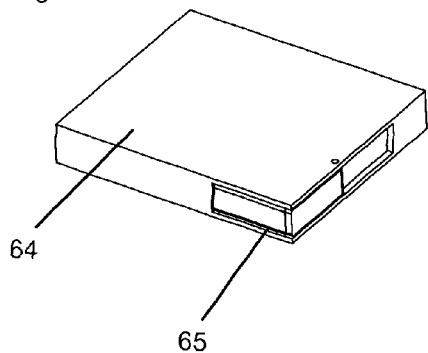
Figure 20A
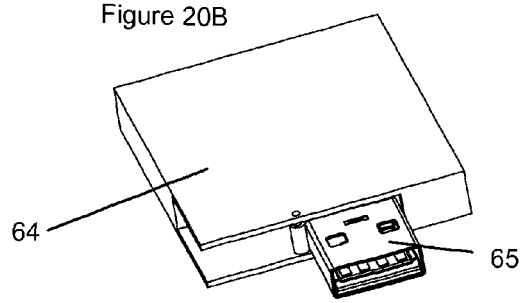
Figure 20B
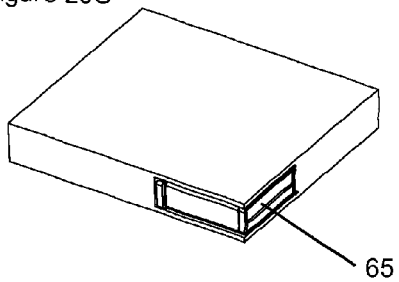
Figure 20C
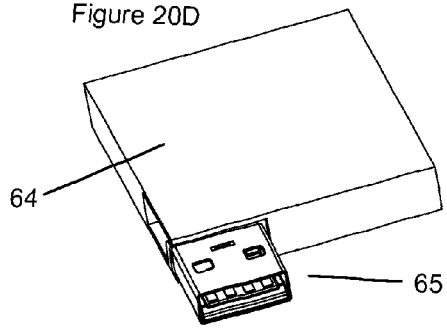
Figure 20D
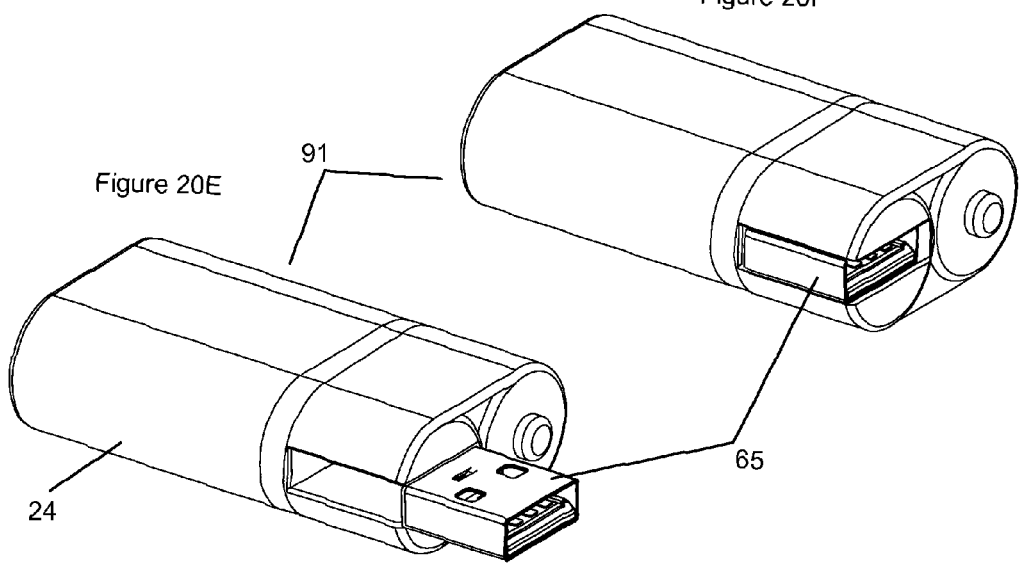
Figure 20E
Figure 20F

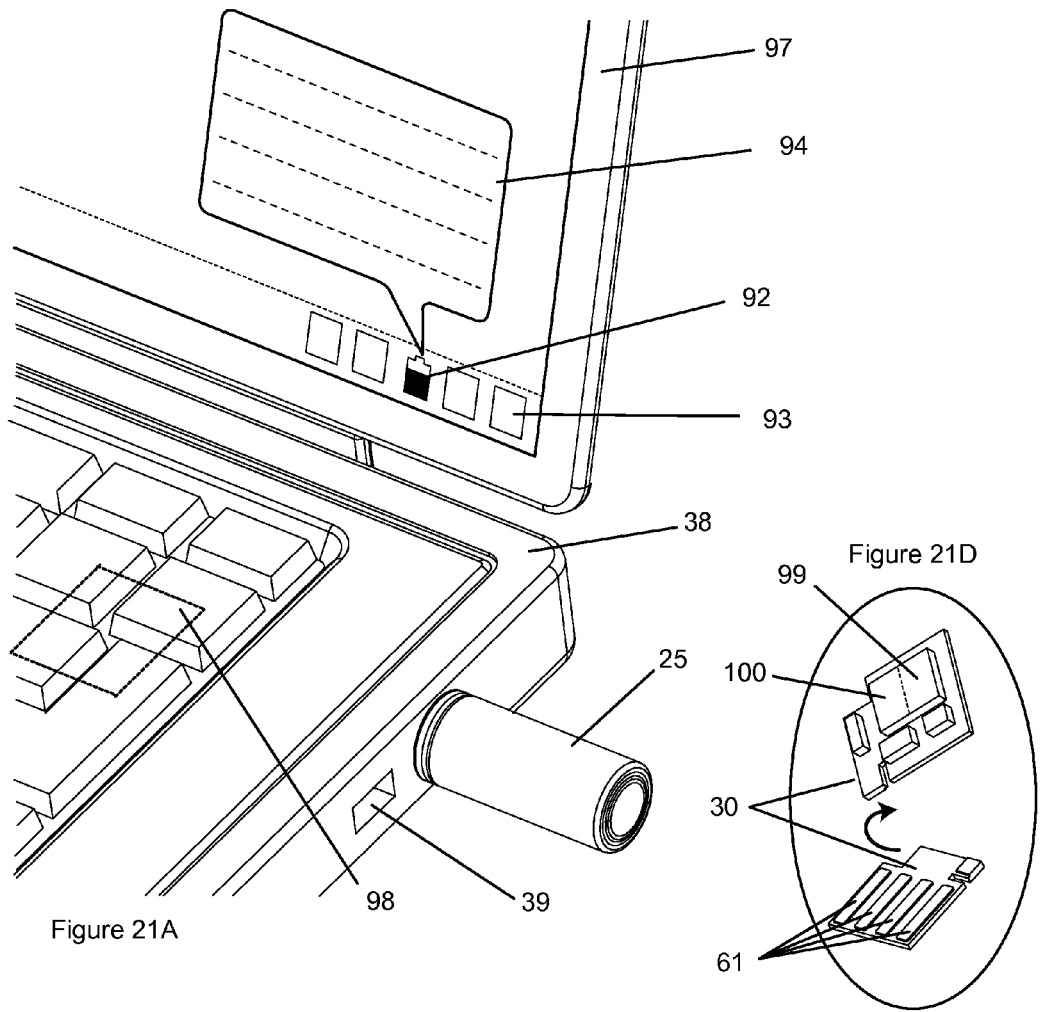
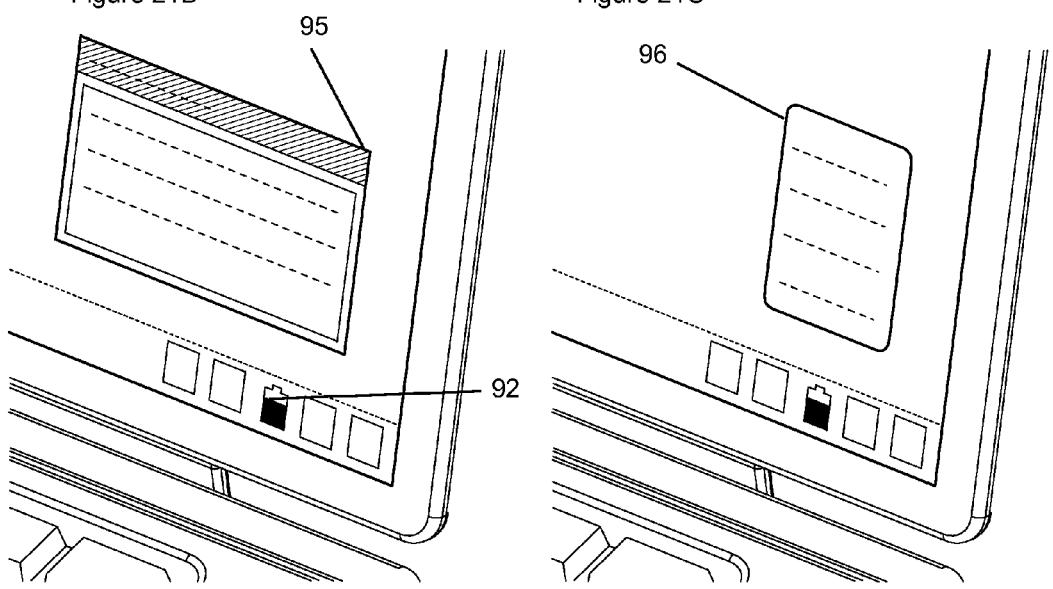

RECHARGEABLE BATTERY ASSEMBLY HAVING A DATA AND POWER CONNECTOR PLUG

CROSS-REFERENCE TO RELATED APPLICATIONS

The present application claims priority from British Patent Application No. 0425967.7 dated 25 Nov. 2004.

STATEMENT REGARDING FEDERALLY SPONSORED RESEARCH OR DEVELOPMENT

Not Applicable.

TECHNICAL FIELD OF THE INVENTION

The present invention relates to a rechargeable battery assembly. The invention relates in preferred embodiments generally to a rechargeable battery that has a deployed configuration forming a regular battery format and a collapsed configuration where an integral connector is revealed that can fold out to enable the battery to be plugged into a suitable 'Bus' socket on a computing device for recharging, such as a standard or miniature USB ('Universal Serial Bus') connector socket. Preferred battery formats are generally cylindrical AAA, AA, C or D types.

BACKGROUND OF THE INVENTION

An ongoing problem with rechargeable batteries is their general dependency on an external recharging unit, plug and AC socket, which are often unavailable when recharging is required. Whilst attempts have been made to embed North American style mains supply connectors within large battery assemblies, these require access to a US AC socket. Furthermore all such approaches require a geographic specific plug or connector. Our preferred embodiments provide an integrated and mechanically compact solution for small batteries that are suitable for enabling universal recharging from a general portable or desktop computing device in any territory. This provides a modern rechargeable battery solution in standard formats readily suitable for portable computing accessories such as input devices, digital cameras and media players.

There is substantial and diverse prior art relating to rechargeable batteries in general, both on custom battery formats and transformers with embedded sockets and connectors, some where the connectors fold or slide to reduce profile. There are also many examples of recharging cradles for holding a plurality of batteries that connect either to a mains supply or in some case via a cable or directly to a USB connector or for custom batteries (such as a mobile phone). Various prior art exists on mechanical methods of collapsing the two flat prongs forming a North American mains supply socket, either to reduce format in a transformer or to store within a large format battery such as a C or D type.

By way of example U.S. Pat. No. 4,086,523 by Izumi (1978) shows an example of a large battery encasing sprung folding North American socket connectors and provides a detailed prior art description documenting various related rechargeable battery approaches, from U.S. Pat. No. 2,876,410 by Fry through to U.S. Pat. No. 3,665,285 by Mullersman et al. U.S. Pat. No. 4,622,507 by Persen (1986) discloses an integrated battery and re-charger for a large format battery with a removable mains plug. Similarly U.S. Pat. No. 5,449,567 by Yeh (1995) discloses a battery with integral mains supply connectors that slide out from the large format battery. Various other mechanical solutions appropriate for large format batteries and North American AC sockets are searchable within these patent families. Of particular note is the connector approach disclosed in U.S. Pat. No. 5,538,805 by Aragon for connecting a sleeve over AC power blades on an external plug connected to a socket. Whilst a strip containing AC power slits has been used in a similar manner on previous art, the inclusion of this as a small flexible strap is perhaps the only prior art identified that proposes a method of embedding a AC power connector within the small form factor batteries such as AA and AAA that do not have space for supporting rigid AC power blades internally. However, this approach is only appropriate in combination with an external North American plug and AC mains supply so does not address the geographic issue.

Prior art also exists at the ornamental or aggregate assembly level for various portable electronic devices such as memory cards, media players, digital cameras that have methods of enclosing or reducing the impact of a connector, such as a rigid USB, by having a removable lid, sliding cover, or overall hinge mechanism. By way of example U.S. Pat. No. 6,456,500 by Chen, shows a typical memory device employing a sliding sheath and slot to enclose a projecting adapter to protect it during transportation. Similarly the more recent U.S. Pat. No. 6,808,400 by Tu discloses a specific structure for protecting the USB with a spring sliding element.

However, despite the large volume of granted patents covering various approaches for rechargeable batteries with integral connectors, either as custom devices or devices forming an existing standard format, the prior art has not addressed or presented a mechanical approach of integrating a generic USB or other computer peripheral connector into a small format battery that can form a typical battery in one configuration in which it can be used in an identical way to the standard format battery, and can form a further configuration in which the peripheral connector is exposed and deployed suitable for recharging. Furthermore, no approach has presented a mechanical method of providing a USB connector in such a manner as to be integrated within a battery assembly, either as a flexible configuration or as a rigid folding configuration or in such a manner as to form a reduced section suitable for fastening within a USB socket. Similarly no prior art examined has proposed a battery adaptor suitable for converting an AAA battery into a AA format with an integral external connector. Nor has it disclosed the approach of embedding recharging circuitry within the USB connector volume itself.

SUMMARY OF THE INVENTION

According to the present invention, there is provided a rechargeable battery unit; and, a data and power connector plug; the battery assembly having a deployed configuration in which the battery assembly has the general form of and functions as a conventional battery format, and a recharge configuration in which the data and power connector plug is made accessible to enable said connector to be connected to a suitable receptacle on a computing or peripheral device for recharging of the battery.

The connector plug is preferably a USB connector. Alternatively, a FireWire connector or other suitable connector type can be used. The present invention preferably provides a rechargeable battery with integral USB connector that forms a typical and standard small battery format, such as an AAA, AA type or larger format, with a recharge configuration that reveals a USB connector suitable for convenient recharging in a portable or desktop computing device, without the typical geographic problem associated with recharging batteries of carrying a separate recharging adaptor or unit for charging directly in AC mains sockets. The battery therefore provides a universal battery suitable for using in many devices and particularly in computing peripherals, such as input devices, digital music players and cameras. A further advantage of the invention is to provide a rechargeable battery with integral USB in an AA format that can receive a standard rechargeable AAA battery unit providing manufacturing efficiency or the option for a consumer to recharge their individual AAA batteries.

Preferably, the rechargeable battery unit has a smaller length than said battery assembly, and said connector is located adjacent said rechargeable battery unit and is rigidly supported directly or indirectly by said rechargeable battery unit. The rechargeable battery unit may be a discrete unit provided separately from said connector. Alternatively, the rechargeable battery unit may incorporate at least part of the connector or circuitry or support therefor within the battery unit.

In a further preferred embodiment the rechargeable battery assembly comprises a cap for covering the data and power connector plug in the deployed configuration. The cap may have a first terminal and the battery assembly may have a second terminal to deliver current to a load connected between the first and second terminals. The cap may have a prong for making an electrical connection between the first terminal and the rechargeable battery unit thus bypassing the connector. The rechargeable battery assembly could be implemented in a compact AA cylindrical format with a sliding outer sub-section or end-cap, and a rigid USB connector that could be either a micro or standard format, and using a reduced length AA type internal battery encased within the overall assembly.

In one embodiment of the present invention, the rechargeable battery assembly comprises a casing for containing the rechargeable battery unit and the connector. The battery assembly may have at least one terminal formed on a movable section of the battery casing, and the movable section of the battery casing may be movable to make the connector accessible. The connector may be made accessible by sliding a sub-section of the casing relative to the rest of the casing, the sub-section having a hole through which said connector can pass upon said sliding. As an alternative, the connector can be made accessible by sliding a sub-section of the casing relative to the rest of the casing to allow the connector to pivot out of the casing to an accessible position.

In one embodiment of the present invention, the connector is constructed and arranged to be able to fold between a rigid form suitable for making a said connection when the battery assembly is in said recharge configuration, and a storage form suitable for being accommodated within the envelope of said battery assembly conventional battery format when the battery assembly is in said deployed configuration. The connector may be formed from two units hinged and sprung together along a central axis, where each unit supports a respective power and data connection prong and supports side plates that are sprung hinged or fixed, such that the connector in its rigid form has a partial box-section with rigid sides arranged in a perpendicular fashion.

The rechargeable battery assembly, of the present invention, in a preferred embodiment comprises an outer case formed to be a regular cylindrical battery format in a deployed or storage configuration, which supports a sliding sub-section, internal recharging circuitry and a folding integral connector that is accessible in the charging configuration. The outer casing may be generally shaped to be AAA or AA format with a standard metallic positive prong at one end and a flat metallic face on the opposite end where the face is directly hinged to the outer casing or may support sprung hinging flaps to allow a connector to protrude in the charging configuration. The integral connector in a preferred configuration is a micro (Series B) or full-size (Series A) USB connector plug comprising two power and two data prongs and is connected to local USB control circuitry to regulate power recharging. The USB connector may preferably be formed as a collapsible sub-assembly by hinging along a central axis and along the metallic edges to allow a more compact storage configuration within an AA or AAA battery. The overall USB assembly may be connected to a folding axis, to enable the USB to rotate for easier access in the charging configuration. The collapsible USB assembly may be formed with a reduced cross-section profile consisting primarily of two sides and a base to reduce the overall storage volume whilst maintaining the ability of locking securely within a respective USB socket. The sliding sub-section in a preferred configuration would consist of a sub-section of the outer shell that can slide relative to the outer casing and may preferably be supported by a shaped section with appropriate rails and grooves.

In a preferred embodiment the rechargeable battery assembly has a casing and a first standard battery format, said rechargeable battery unit has a second standard battery format smaller than said first standard battery format so that the rechargeable battery unit can be contained in the casing, the rechargeable battery unit being removable from said battery assembly. The rechargeable battery assembly may be implemented in an AA cylindrical format with a sliding outer sub-section, and a hinged folding sub-assembly USB connector that is stored by collapsing around a smaller AAA cylindrical format battery stored within the overall assembly. The AAA battery is accessible and replaceable by folding the hinged metallic base of the outer casing, such that the overall assembly acts as a converter of an AAA to AA battery format and to support the folding USB assembly for recharging. The sliding outer sub-section is preferably connected to an internal support structure, that is shaped to fix within the outer cylinder and support two guide rails for locking and allowing sliding of the outer partial cylindrical shell sub-section, and also preferably forms rotation pins for supporting the folding USB axis. The structure may be shaped internally to provide a cylindrical groove for positioning and enabling sliding of the AAA battery. The overall structure may support internal wiring or electrical connectivity to connect the sliding battery to both the outer AA end faces and to the USB control circuitry and connector. The hinged metallic base may preferably support the USB control chip circuitry. The overall mechanism may support sprung biasing means such that the USB sub-assembly spring folds together and folds open as the sliding sub section is fully open and secured over a release catch, with a corresponding reverse action by folding the USB inwards onto the locking catch on the sliding sub-section allowing it to return to the closed storage configuration.

In a further preferred embodiment the collapsible rechargeable battery assembly could be implemented in a compact AAA cylindrical format with a sliding outer sub-section or end-cap, and a hinged folding sub-assembly USB connector that is stored in a collapsed form and a reduced shorter section two thirds length AAA type battery fully encased within the overall assembly. The USB sub-assembly could be identical to that previously described and formed with a central folding axis. Such an approach would have advantages in volume manufacture by using a standard component. The sliding sub-section could be implemented as partial cylindrical shell or as a full cylindrical tube with a slot and hinged flaps forming the metallic face of the overall outer casing.

In a preferred embodiment, the battery assembly comprises recharging circuitry at least some of which is accommodated within the envelope of the connecting part of the connector. The USB assembly could be formed encasing the USB circuitry control chip achieved through using a thin circuit board with the chip and components on one side and the four USB connector prongs (formed of electrical contacts) on the reverse accessible side together with appropriate plastic encasing and the external metal connector surround. Such a USB connector with integral circuitry again has the advantage in manufacturing of simplifying the overall volume production, and maximizes the remaining volume for battery storage within the overall AA format. The sliding sub-section could be implemented as a full cylindrical tube or end-cap with a slot and hinged flaps forming the metallic face of the overall outer casing with corresponding grooves in the main outer casing such that the action of changing the battery from the deployed or storage configuration to the recharging configuration is achieved via a simple twist and slide action of the cylindrical end-cap.

The preferred USB assembly integrating recharge circuitry on the under side has a benefit in a manufacture process of separating the normal battery cell chemistry manufacturing from the post-process of assembling the cell with the USB assembly and battery cap.

Both the AA and AAA embodiments could optionally be implemented with a reduced Series B USB or alternatively as a FireWire (IEEE 1394 standard) plug but with corresponding reductions in internal battery length and usability with older desktop, hubs and laptop systems not supporting these more compact connectors. Similarly a rigid USB connector could be integrated into larger format C or D type batteries, as well as alternative battery formats with higher voltage requirements with corresponding circuitry.

In an embodiment, the rechargeable battery assembly comprises circuitry for providing power management and recharging controls, and an indicator arranged and configured to indicate current battery power status. The USB control circuitry would in a preferred embodiment comprise one microcontroller chip and minor supporting external sub-circuitry (such as resistors), and would serve under the USB standard to notify the central host/computer the peripheral USB type, and request a higher current from the initial 100 mAh standard, to the current maximum 500 mAh as well as to monitor voltage recharge rates to ensure a safe charge. Optionally an LED indicator could be integrated within the battery casing to indicate low or complete charge, along with corresponding software features on the host to provide a graphical or precise reading of current charge status, recharge quality, including potentially charge history.

In a further embodiment the controller chip could be a simple control circuit that can request charge and manage charge rates without using the USB standard. Future extensions of the USB standard may allow higher charge currents approaching 2000 mAH enabling faster charge with suitable circuitry and battery technologies.

In an embodiment, the rechargeable battery assembly comprises circuitry for providing power management and recharging controls, and/or an indicator arranged and configured to indicate current battery power status. The software application when executed may be operable to provide information concerning the battery and charging of the battery unit to a said computing device via the connector. The software application when executed may be operable to control a said computing device to display an icon representing the battery unit charging information. The battery unit charging information may comprise at least one of charge level information and charging state information. The software application when executed may be operable to provide a user interface on a said computing device, through which a user can interact with the software application. The software application when executed may be operable to provide at least one battery management control on said computing device that is controllable through said user interface. The software application when executed may be operable to provide a menu including selectable options on a said computing device. The software application when executed may be operable to control a said computing device through the connector to access a remotely located resource, which may be a web page for example.

In an embodiment the rechargeable battery assembly comprises a memory storing a battery identifier information. The software application when executed may be operable to provide the battery identifier information to a said computing device through the connector. The battery identifier may be a unique battery identifier and used to provide at least one of: battery management and control information; direct customer relationship management services, which may be end of product life replacement sales; marketing promotion information, which may be a voucher or discount; and, unique identification for a lottery prize.

A key advantage of the preferred rechargeable battery is for portable electronics and portable computing accessories, which typically use AA or AAA batteries and are often used in wireless or USB connectivity with computers for communication or data upload or download. Examples include wireless mice, digital cameras, MP3 players. Whilst some have integrated custom rechargeable batteries, many use a standard AA or AAA battery that often runs out when travelling, or when the device is needed with the computer. Furthermore, it is often perceived to be awkward to carry yet another charger unit or adapter with such devices. The USB battery therefore provides a suitable product that could be shipped at source with the device, camera, or peripheral, and has the convenience of recharging via the standard USB receptacle when travelling or from a nearby desktop, hub or printer. Similarly the battery could be preferred in remote control units for home entertainment or in other appliances. Of particular note is that the preferred approach of a battery converter for AAA to AA may lead to a volume production price for the additional collapsing USB mechanics that provides for an economic rechargeable battery. Similarly the reuse of the collapsing USB mechanics in the AAA format battery also provides ready economies of scale on the unique components.

There is also provided in an embodiment a method of communicating the status of a rechargeable battery assembly as described above to a user, comprising: connecting said connector of said rechargeable battery assembly to a corresponding receiving connector of a computing device; sending information about the status or history of the rechargeable battery unit to the computing device; receiving said information by a software process running on said computing device; and, displaying a message by said software process on the screen of said computing device.

There is also provided in an embodiment a method of communicating the status of a rechargeable battery assembly as described above to a user, comprising: connecting said connector of said rechargeable battery assembly to a corresponding receiving connector of a computing device; sending information about the status or history of the rechargeable battery unit to the computing device; receiving said information by a software process running on said computing device;

and, sending secondary information relating to said information to another computing device across a network attached to said computing device.

A benefit of a circuit including a microcontroller that can perform USB communication is to allow status and message information to be displayed on the computer device. By way of example, connecting the battery into a USB socket could be identified by means of an icon on a window status bar on the computer. The icon could display the amount of charge remaining in the battery or pop up an alert message when the battery is first connected, at intervals during the charge and on recharge completion. Similarly the icon could be interactive and allow messages to be displayed on selection or pop up a menu bar to allow more complex requests.

In a further preferred embodiment, the pop-up could open an application or a web page that enables the consumer to buy similar batteries or other products, or be provided with information on recycling. The battery at end of life, when charge cycles are reducing, could automatically prompt a potential reorder by means of such alerts or taking the consumer directly to a web page. The battery could also act to provide marketing or campaign information, have a unique product id, and in a further embodiment act as a lottery battery when indicated by either a custom circuit or embedded ID, that might be inserted in a small sub-sample of batteries produced. The system and methods provide several new CRM (customer relationship management) opportunities to perform direct selling, education, campaigns or other services for the consumer, and may have significant advantage for a battery company or for promotions.

The invention could be implemented with a variety of different battery chemistries such as NiMH, fast charging cells, or high capacity Lithium Ion Polymer, and other new technologies. As fuel cell and other environmental technologies roll out, a portable PC or computing device may implement fuel cells as a power supply, increasing the capacity and potential for the device to act as a charging station. A significant benefit of the preferred embodiment is that it would enable portable devices to retain the AA or AAA format and take advantage of rechargeable batteries that can be charged by connecting to a PC with a fuel cell, whereas fuel cell technology will take a significant amount of time to become viable in small format cells.

In a preferred embodiment, the rechargeable battery unit is arranged so as to be capable of being recharged by using a conventional battery recharger and applying recharging current via terminals of the battery assembly rather than via said connector. An advantage of the battery having a standard format cell is that the cell could be fast charged via a regular external charger, whilst retaining the benefit of recharge convenience or battery top-up convenience for users on the go. The effect is that there is provided the new feature of recharge convenience whilst retaining traditional fast charge benefits. In such embodiments the cap described above may support a prong to enable the positive plate to bypass the circuitry and connect by means of a prong directly to the internal battery cell rather than through the USB circuit prongs, so as to reduce risk of battery usage or mains recharging passing to much current through the recharge circuitry.

A variety of embodiments are possible for the front cap, whereby the cap is shaped to have an external end form that is a standard format battery shape (either as a positive or negative terminal), and is either attached to the overall assembly and foldable or slidable, or may in some embodiments be removable and storable by attaching to the rear of the battery when recharging. Example cap embodiments include where the lid is hinged and folds laterally, where the lid is formed from at least two parts and opens and folds on either side of the battery, where the lid supports a recess that enables an internal USB assembly to slide outwards, where the lid has a side slot enabling it to be hinged directly out, where the lid is connected via a spring or flexible hinge mechanism. The cap when removable could be shaped with a flexible end and support magnetic means to enable the cap to be temporally attached to the rear of the battery, or could support a shaped recess to be friction attached, or support a folding mechanism to allow the cap to be attached.

A variety of mechanisms are possible for connecting the preferred USB assembly to the battery unit/cell. As an example a standard reduced length cell could be used and support an additional face plate that electronically and mechanically connects and supports the USB assembly. In a further embodiment the face plate could be customized and formed in layers that are affixed directly during manufacture of a custom internal battery cell.

In small formats such as AAA where an integral USB connector is hinged, various embodiments can enable the USB connector circuit board to fold and store within the battery cell, where the connector is folded in half it could be supported centrally, or where one half is fixed to the battery cell and the second half folds out laterally. Alternatively the circuit board could be fixed centrally and have two side folding sections. Current mini-USB and future reduced formats reduce the need for folding circuit boards in the AAA cell.

The invention could also be applied to packs of batteries, where one battery is a reduced cell supporting a folding or sliding USB connector and appropriate circuitry that again forms a regular external format. Similarly the invention could be applied to cuboid batteries and larger formats.

Accordingly the overall collapsible rechargeable battery assembly provides a significant innovation in both product and usage with non-AC mains supply that could improve the viability of standard format rechargeable batteries in portable devices and in the domestic environment.

The present invention comprises a combination of features and advantages which enable it to overcome various problems of prior devices. The various characteristics described above, as sell as other features, will be readily apparent to those skilled in the art upon reading the following detailed description of the preferred embodiments of the invention, and by referring to the accompanying drawings.

BRIEF DESCRIPTION OF THE DRAWINGS

Embodiments of the present invention will now be described by way of example with reference to the accompanying drawings, in which:

FIGS. 1A,1B,1C show a three dimensional staged view of an example of a rechargeable battery device according to the present invention configured in a preferred embodiment as an AAA to AA converter with collapsible USB connector and shown in the deployed storage configuration, half open configuration and recharging configuration. FIG. 1D shows a three dimensional exploded component view of the rechargeable battery device. FIGS. 1E,1F show a cross-sectional end view showing the battery section with collapsed and deployed forms of the USB connector;

FIG. 2A shows a three dimensional exploded component view of an example of a rechargeable battery device according to the present invention configured in a preferred embodiment as an AAA battery format with collapsible USB connector. FIGS. 2B,2C,2D show a three dimensional stages view of the device in the storage, half open and recharging configurations. FIGS. 2E,2F show a cross-sectional view of the battery cross-section and collapsed USB form;

FIG. 3A shows a three dimensional exploded component view of an example of a rechargeable battery device according to the present invention configured in a preferred embodiment as an AA battery format with integral rigid USB connector supporting embedded circuitry. FIGS. 3B,3C,3D show a three dimensional stages view of the device in the storage and recharging configurations;

FIGS. 5 to 8 show an example of a preferred embodiment of an AA battery configuration according to the present invention;

FIG. 5 shows a preferred embodiment of the rechargeable battery device configured as an AA battery format device which is shown in a front view in FIG. 5A and rear view in FIG. 5B and shown with the USB connector deployed in FIG. 5C with the front cap section removed;

FIG. 7A shows example circuitry arranged within the USB connector assembly. FIG. 7B shows a further more detailed exploded of the embodiment of FIG. 5 and FIG. 6 showing the layers forming the battery unit, the layers forming the USB connector assembly and the removable front cap;

FIG. 8 shows cross sections through a preferred embodiment of the AA battery showing the sub components of the USB assembly and joining plates and layers of the battery cell;

FIGS. 10 to 12 show further examples of preferred AA embodiments according to the present invention;

FIG. 10 shows an AA embodiment formed using a standard reduced length battery cell connected via a custom face plate to a USB assembly and supporting a split folding front cap that opens in two halves. FIG. 10A shows the battery in the standard usage format. FIG. 10B shows the battery with front cap folded back and FIG. 10C shows an exploded view of components;

FIG. 11 shows an AA embodiment formed using a standard reduced length battery cell connected via a custom face plate to a USB assembly and supporting a hinging front cap. FIG. 11A shows the primary sub-sections. FIG. 11B the battery in the standard usage format. FIG. 11C the battery in the recharge configuration and FIG. 11D an exploded view of primary components;

FIG. 12 shows an AA embodiment where the USB connector slides out of the battery cell in the recharging configuration.

FIGS. 13 to 15 show further examples of preferred AAA embodiments according to the present invention;

FIG. 13 shows an AAA embodiment with half folding USB connector and hinged folding front cap. FIG. 13A showing an exploded view of components. FIG. 13B the battery in the standard usage format. FIG. 13C and FIG. 13D in a partially open state, and FIG. 13E in a fully open recharge configuration state with front cap folded back;

FIG. 14 shows an AAA embodiment with bi folding USB connector with FIG. 14A showing the battery in the standard format usage state, FIG. 14B and FIG. 14C in a partially open state and FIG. 14D in a fully open recharge configuration state with front cap folded back, and FIG. 14E an exploded view of components;

FIG. 15 shows an AAA embodiment with reduced mini-USB connector and hinged folding front cap with FIG. 15A showing the battery in the standard format usage state, FIG. 15B in a partially open state and FIG. 15C in a fully open recharge configuration state with front cap folded back, and FIG. 15D an exploded view of components;

FIGS. 16 to 19 show further examples of preferred embodiments of the present invention having an attachable removable front cap, shown for example on a preferred AA embodiment;

FIG. 16 shows a preferred embodiment of a front cap that slides over the USB assembly and has two folding sections that enable the cap to be supported by affixing to the rear of the battery when the battery is in the recharge state. FIG. 16A shows an example of the battery with cap when recharging in a socket of a computer device, FIG. 16B the battery with front cap attached to the rear of the battery, FIG. 16C the cap mechanism and FIG. 16D the battery with front cap attached with the battery in the standard usage format;

FIG. 17 shows a preferred embodiment of a front cap that slides over the USB assembly and has an example shaped recess that enables the cap to be supported by affixing to the rear of the battery when the battery is in the recharge state.

FIG. 18 shows a preferred embodiment of a front cap that slides over the USB assembly and has semi-flexible outer casing and magnet means that enable the cap to be supported by affixing to the rear of the battery when the battery is in the recharge state. FIG. 18A shows an example of the battery with cap when recharging in a socket of a computer device. FIG. 18B the battery with front cap attached to the rear of the battery, FIG. 18C the cap mechanism and FIG. 18D the battery with front cap attached with the battery in the standard usage format;

FIG. 20 shows examples of preferred embodiments of the present invention applied to batteries of other formats, where in FIG. 20A a hinged USB assembly folds out of a rectangular battery format, such as might be found as example in digital cameras or mobile phones, to provide an exposed USB assembly, as shown in FIG. 20B, suitable for recharging. FIG. 20C and FIG. 20D show a further embodiment where the USB assembly slides out. FIG. 20E and FIG. 20F show a further embodiment where a USB assembly slides out of a battery pack comprising a regular AA cell and reduced format cell; and, FIGS. 21A, B, C, and D show examples of status and control information being displayed on a computing device during recharging in accordance with an embodiment of the present invention, shown in FIG. 21A as a status information alert, in FIG. 21B as a control application window and FIG. 21C as a menu selection control panel. FIG. 21D shows an example of a USB connector having circuitry with a processor and/or a memory according to an embodiment of the present invention.

Figure 4:
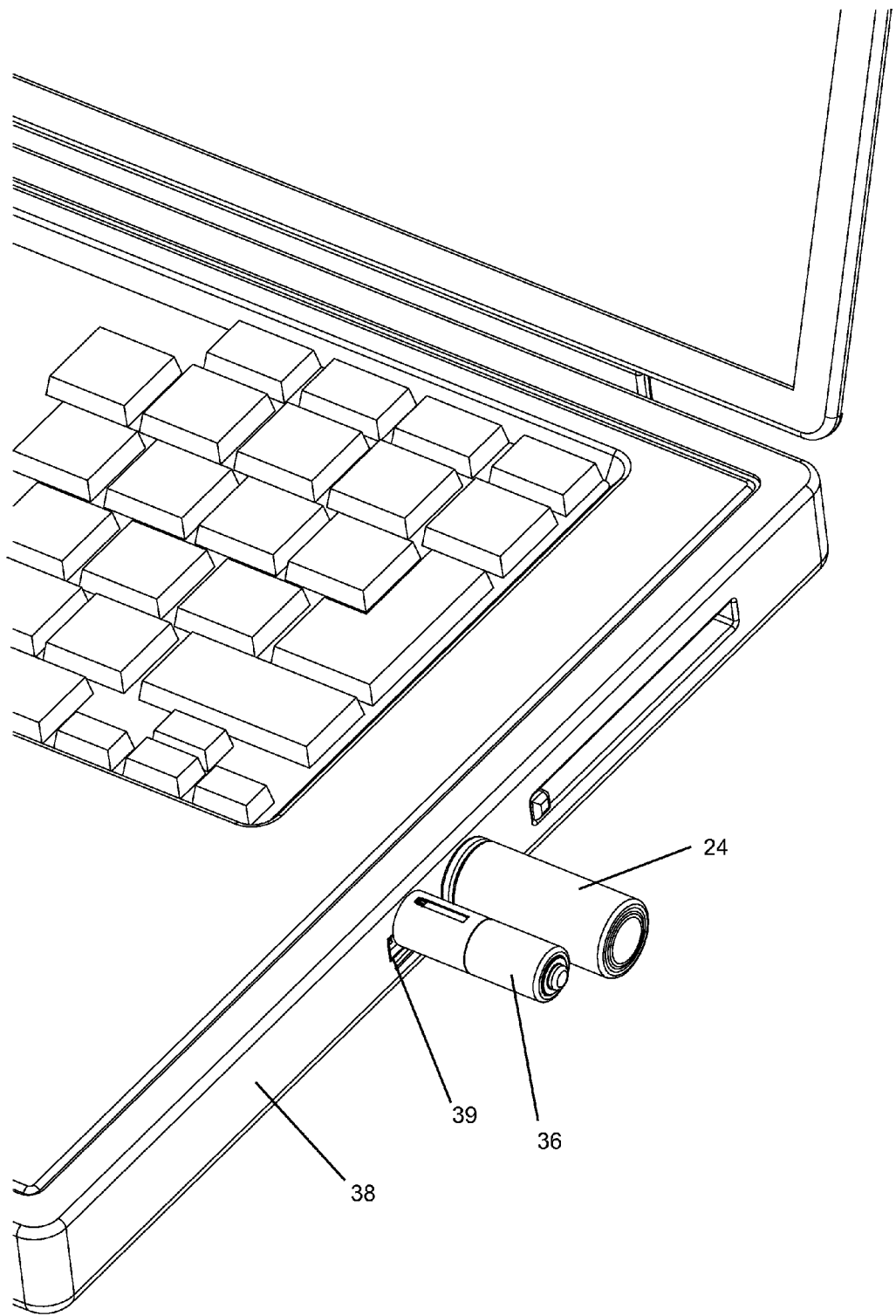
FIG. 4 shows example AA and AAA embodiments of a rechargeable battery device according to the present invention connected into a socket on a computing device for recharging.

Preferred embodiments of the invention will now be described with reference to the accompanying drawings herein.

DETAILED DESCRIPTION OF THE PREFERRED EMBODIMENT

FIGS. 1A,1B,1C show a three dimensional stages view of an example of an overall rechargeable battery assembly 1 configured as an AAA to AA converter according to an embodiment of the present invention and shown in a storage configuration 2; a half open configuration 3, where a sliding sub-section 6 comprising a partial cylindrical shell is open; and, a recharging configuration 4, where the integral collapsible USB connector plug 5 has folded together and deployed to an angle suitable for convenient recharging in a corresponding USB receptacle. The overall collapse mechanism may be biased by integral springs such that sub-section 6 has a biasing to close to form the storage configuration, and the USB connector plug 5 has a biasing to spring out when the sub-section 6 is open, and is internally biased to form a USB connector cross-section where the three sides are perpendicular and form a partial tube. The sliding sub-section 6 optionally has a release catch moulding that fastens the sub-section in the open position until the connector plug 5 is manually folded against the spring biasing back fully into the device releasing this catch.

FIG. 1D shows a three dimensional exploded component view of the overall rechargeable battery device 1 which has from an outer shell 7 formed to represent a typical cylindrical AA format battery with a positive polarity metallic prong 8 at one end and negative polarity conductive rear plate 9 on the opposing parallel face. The rear plate 9 may optionally support chip control circuitry 10 and is physically attached to the outer shell 7 via a hinge axis 11 to facilitate insertion of a smaller rechargeable AAA battery 12 at manufacture or substitution by the consumer, where a conductive sprung prong links the rear plate 9 with the rear plate of battery 12. The removable battery 12 has a direct metallic connection with the underside of the positive prong 8 and is held in position via an internal support structure 13 that has a suitable curved cross-section to support an AAA battery, and opposing rails 14 that support and fasten the sliding sub-section 6 and may be formed with a conductive insert suitable for connecting the positive polarity prong 8 to the USB connector 5. In an alternative embodiment, this may be achieved by forming the outer shell 7 as a conductive layer in the usual manner and insulating this from the rear section 9 and also from the outer surface of the USB connector 5. The support structure 13 also supports support holes 15 or an axis for fastening and hinging the USB connector 5, which in a further embodiment could be partially slidable within the shell casing 7 to provide a further flexibility in positioning the USB connector 5.

The rear plate 9 supports control circuitry 10 on a thin form circuit board, connected via a flexible wire or membrane to the USB connector 5, which supports two data and two power prongs, and mediates identifying the peripheral to a host device when connected, and requesting an initial 100 mAh and then 500 mAh charge rate and to regulate voltage to control charging. The circuitry or secondary components could in an alternative embodiment be positioned within a recess within the support structure 13 that could provide more advanced controls and LED charging status.

The USB connector plug 5 is preferably formed from a sub-assembly comprising two hinging elements 17,18 that support a metallic underside and pronged upper side, each element 17,18 having one power and one data prong. The elements 17,18 are sprung hinged together about their inner axis 21 such that they form a flat surface when deployed. Each hinging element supports a hinging metallic side piece 19, 20 respectively such that the overall sub-assembly forms a box-shape cross-section with all faces perpendicular when deployed. The edge of side pieces 19, 20 forms a small curved lip shape so that the overall assembly slides and locks in the usual manner within a USB receptacle. The overall USB connector 5 has axis pins 16 that correspond to holes 15 in the support structure, and have a protruded axis, such that they fasten the connector to the support structure both in the collapsed and deployed configuration. The overall connector 5 is connected to the control circuitry 10 and battery nodes by means of wires or a flexible membrane. In a further embodiment the axis pins 16 may act as a conductive pins between conductive rails 14 to facilitate electrical connectivity between the internal battery 12 and the USB connector 5.

FIGS. 1E,1F show the cross-sectional view through the overall battery device 1 showing more clearly the storage profile 22 of the collapsed USB connector 5 around battery 12 and the associated deployed USB connector 5 when in the box configuration 23 with the reduced upper cross-section compared to a full Series A USB plug.

FIG. 2A shows a three dimensional exploded component view of the rechargeable battery device configured as an AAA battery format 36 with collapsible USB connector 5. The battery device 36 has an outer shell 25 with typical positive battery prong 35 at one end, and internal structure 26 with a grooved recess 32 that fastens a sliding rear shell cap 27 in such a manner to facilitate a twist and sliding movement. The rear structure 26 supports a collapsible USB connector 5 that is formed as a sub-assembly comprising two hinging elements 17,18 that support a metallic underside and pronged upper side. Each hinging element 17,18 has one power and one data prong. The hinging elements 17,18 are sprung hinged together about their inner axes 21 such that they form a flat surface when deployed. Each hinging element supports a fixed or optionally hinged metallic side piece 19,20 respectively such that the overall sub-assembly forms a box shaped cross-section with all faces perpendicular when deployed. The edges of side pieces 19 and 20 form a small curved lip shape so that the overall assembly slides and locks in the usual manner within as USB receptacle. The overall USB connector 5 is affixed by a pivot of hinge 21 to an internal sub-structure 26 that supports electronic circuitry 10 and electrical connectivity to a reduced battery unit having approximately two thirds of the length of a regular AAA battery. The USB connector 5 is linked via wires or wire membrane to equivalent circuitry 10 in the rear cap 38.

FIGS. 2B,2C,2D show a three dimensional stages view of the battery device in the storage, half open and recharging configurations. The rear shell cap 27 supports a folding cap 38 that supports circuitry 10 and enables the 'V' shaped storage configuration 37 of the collapsible USB connector 5 to expand forming a deployed USB connector. FIGS. 2E,2F show a cross-sectional view of the battery which shows more clearly the 'V' storage form 37 of the collapsed USB connector 5 accommodated within the overall battery device shell 25 and cap 27 assembly.

FIG. 3A shows a three dimensional exploded component view of the rechargeable battery device 24 configured as an AA battery format with integral rigid USB connector 28 supporting embedded circuitry 30. The battery device 24 has an outer shell 25 with typical positive battery prong 35 at one end, and internal structure 26 with a grooved recess 32 that fastens a sliding rear shell cap 27 in such a manner to allow a twist and sliding movement. The internal structure 26 supports a rigid USB connector 28 that is comprised of a circuit board 29 supporting four USB prongs (2 of power and 2 of data) on one side, and control circuitry 30 (being voltage regulator, resistors and mini USB microcontroller) on the other side, together with appropriate internal plastic encasing structure and an external metallic shield 31 forming a regular USB plug. The rear shell cap 27 having a slot 33 to enable USB connector 28 to protrude and two conductive flaps 34 that are sprung biased to fold through 180 degrees when the overall cap 27 is slid back along grooves 32.

FIGS. 3B,3C,3D show a three dimensional stages view of the battery device 24 in the storage and recharging configurations. FIGS. 3B,3C show the storage device forming a regular AA form with normal external positive prong 35. In this configuration the rear shell cap 27 abuts the connector 28 and cannot collapse, and has flaps 34 in their closed configuration forming a flat rear conductive section. Rotating the cap 27 through the groove 32 aligns the slot 33 with the connector, enabling the overall cap to slide to transition the overall device 24 to the recharging configuration as shown in FIG. 3D. Optionally this slide transition may be sprung biased, so that once the cap 27 is twisted the device biases into the charging configuration.

FIG. 4 shows an example of an AA format rechargeable battery 24 according to an embodiment of the present invention and an example of a AAA format rechargeable battery 36 according to the present invention connected into sockets 39 on a computing device 38 for recharging. The sockets are generally available on the side or back of a computing device, or on a hub device, via a cable or on other similar computing devices such as games station.

FIGS. 5 to 8 show a preferred embodiment of an AA battery configuration showing a technical breakdown of components.

Figure 5A:
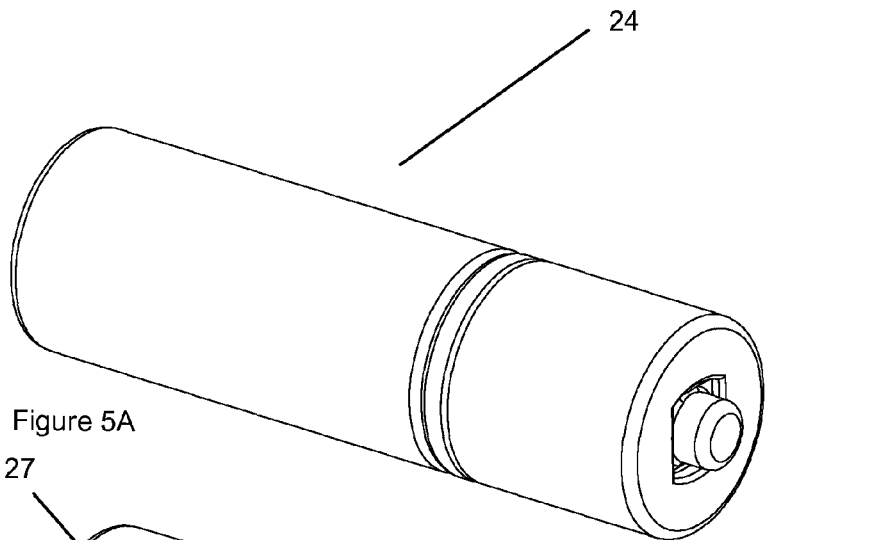
Figure 5B:
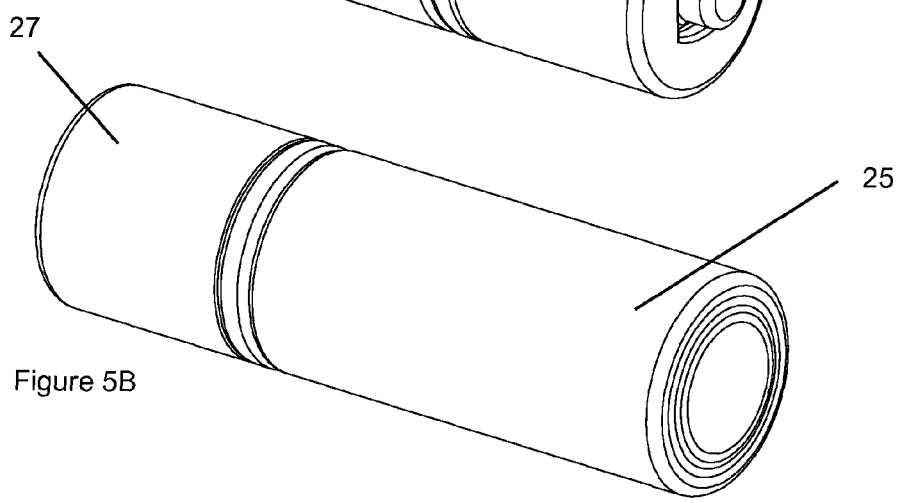
Figure 5C:
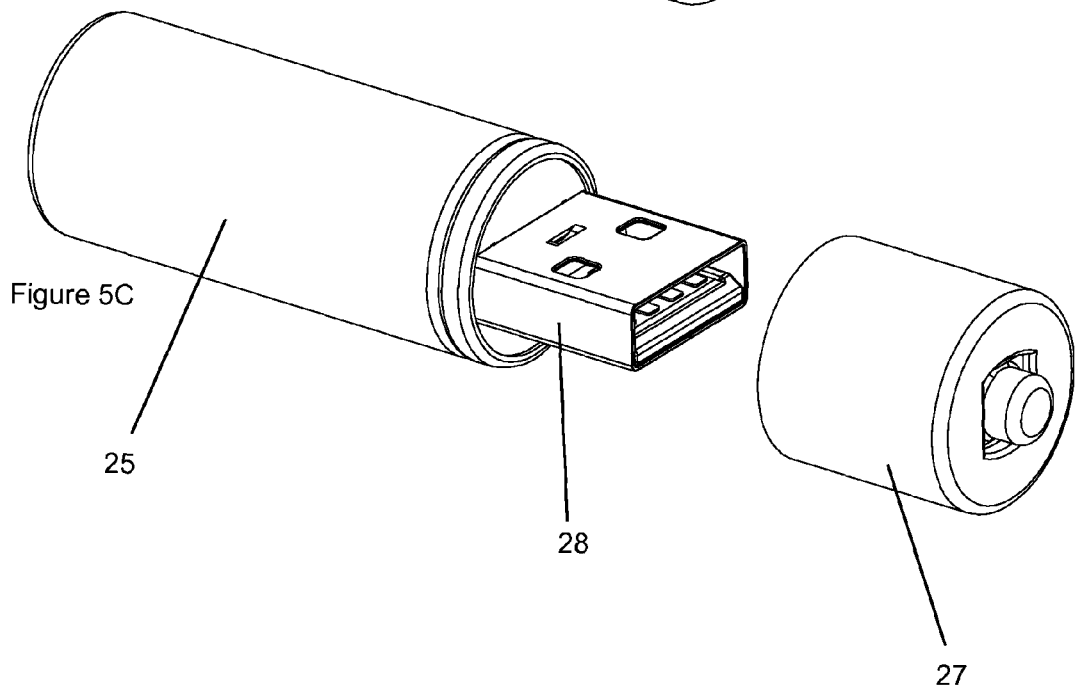

FIG. 5 shows a preferred embodiment of the rechargeable battery device configured as an AA battery format device 24 which is shown in a front view in FIG. 5A and rear view in FIG. 5B which shows the battery to comprise of a front cap 27 and a back section 25 that is or supports a rechargeable battery cell. FIG. 5C shows the front cap 27 removed and the USB assembly 28 revealed and accessible to connect to a socket 39 for recharging, the USB assembly being fixed to the front of the battery cell 25.

Figure 6A:
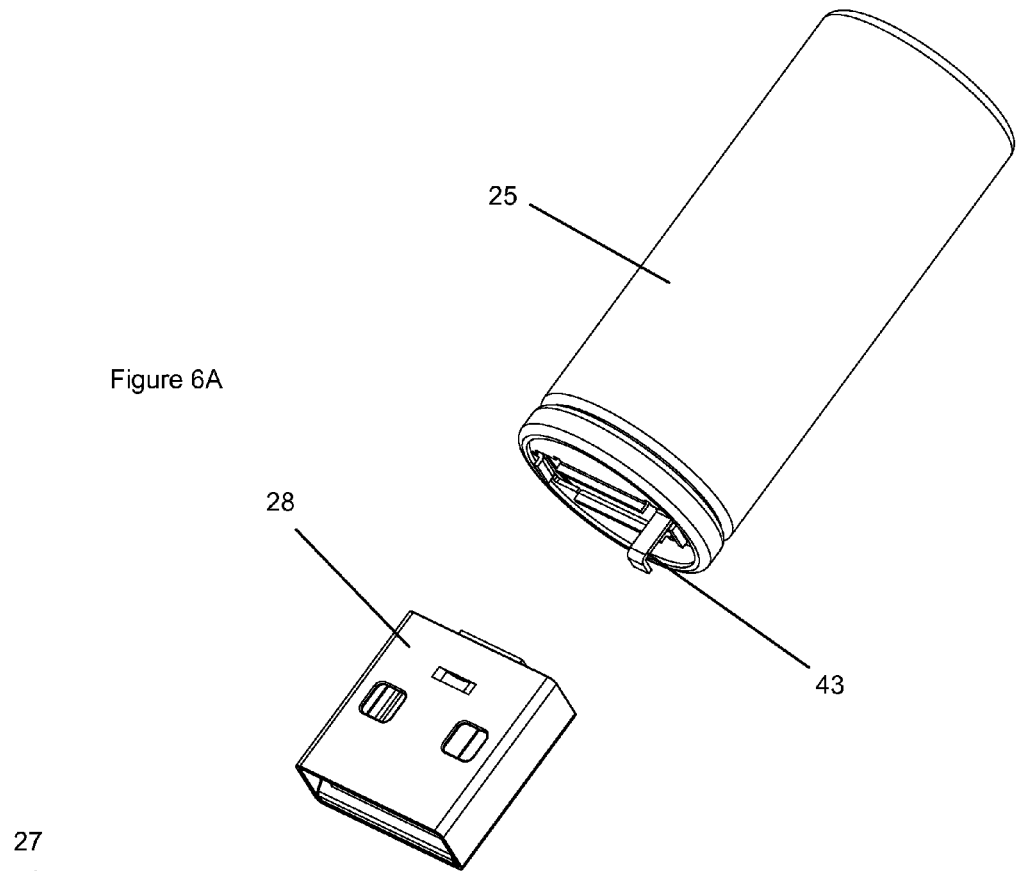
FIG. 6A shows an exploded view of a preferred embodiment of the AA battery shown in FIG. 5 and comprising a battery unit, USB connector assembly and removable front cap, with a cross section view in FIG. 6B showing circuitry within the USB connector assembly.
Figure 6B:
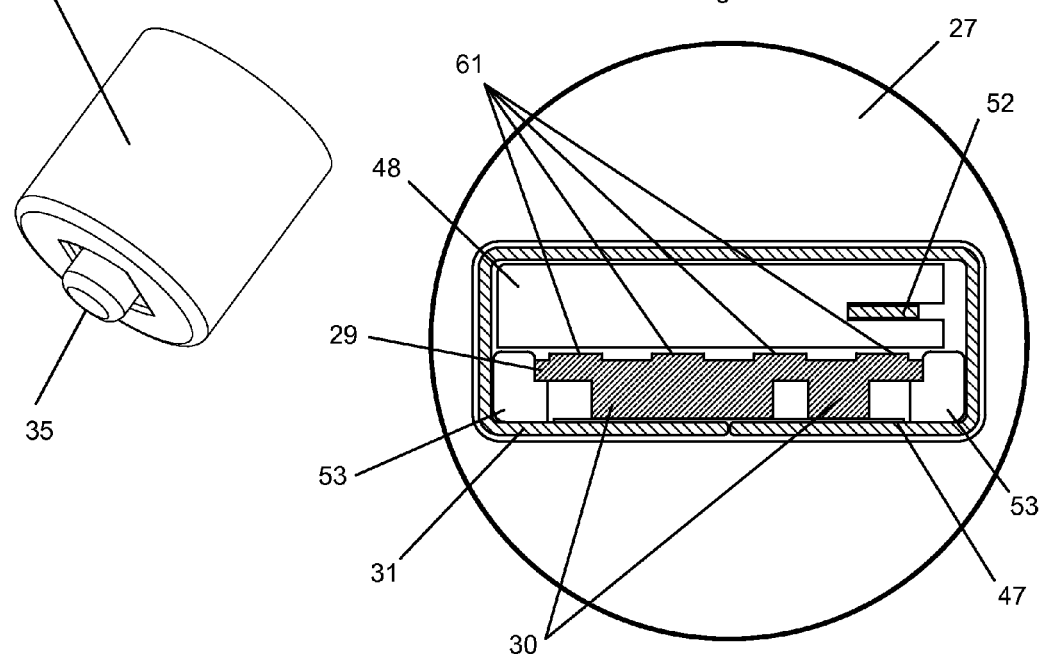

FIG. 6A shows a partial exploded view of a preferred embodiment of the AA battery according to FIG. 5 and comprising a rear battery unit 25, USB connector assembly 28 and removable front cap 27. The USB assembly is attachable during manufacture to the rear battery unit 25 by means of a shaped and formed front plate 43. FIG. 6B shows an end view and cross section through a preferred USB connector assembly, which comprises an outer metal shell 31, an internal circuit board 29 supporting 4 metal prongs 61 mounted on the upper surface (two of power and two of data) with circuitry and chips 30 mounted on the under surface of the circuit board 29 and insulated from the metal by means of filler plastic 47 and edge plastic mouldings 53 that also support and encase the overall circuitry assembly within the USB shell 31. Plastic insert 48 forms a shaping attached to the front cap 27 that slots within the USB assembly when the cap 27 is attached and supports a prong 52 that connects the positive plate 35 on the cap 27 to a connector prong 43 on the rear battery cell 27 to bypass the circuitry when the battery is fast charging via an external adaptor (not shown) or when the battery is in use to provide power.

FIG. 7 shows a further more detailed exploded view of a preferred embodiment of AA battery according to FIG. 5 and FIG. 6. FIG. 7A shows example circuitry 30 arranged on the underside of the USB circuit board 29 that supports prongs 61 on the upper surface. FIG. 7B shows a further exploded view showing the layers forming the USB assembly 28, rear battery cell 25 and cap 27. The USB assembly in a preferred configuration has an outer shell 31, which may be reduced or excluded in some embodiments, an insulation filler 47, a moulded casing 53 that supports rails 54 for affixing the circuit board 29, a shaped recess 55 to fasten the outer shell 31 at an indent and shaping to enable the overall assembly to be fastened to the face plate 46 on the rear battery cell 25. The circuit board also supports a connection plate 62 for connecting power to the rear cell by means of prong 43. The shell 31 also serves as a separate electrical connection between USB assembly and the outer rear face plate 45 on the battery cell 25. The battery cell 25 in a preferred and example embodiment comprises an outer shell 56 with external insulating or marketing wrapper a recessed front crimp 40 a insulating ring 41 a battery cell cap and connector plate 42 supporting a positive prong 43 that passes through an insulating ring 44 that insulates a positive connector plate 42 from a negative outer plate 45. The front cap 27 supports a shaped metallic positive battery cap 35 that connects by means of a prong 52 to a hook 51 that connects with prong 43 for through positive connection when the battery cap is fully in place. The plastic insert 48 supports a plastic prong 50, that serves to spring the prongs 43 and 51 together to ensure a good electrical connection and also to click and reliably fasten the front cap 27 to the rear battery cell 25.

FIG. 8 shows cross sections through a preferred embodiment of the AA battery according to FIGS. 5 to 7, showing the sub components of the USB assembly 28 and joining plates and layers of the battery cell in cross section. FIG. 8A shows the front cap in place where the insert 48 passes into the USB assembly slot, with prong 50 pressing the hook 51 on the positive connection 52 firmly against the prong 43. FIG. 8B shows the position of the cross section line views. FIG. 8C shows the cap 27 removed. FIG. 8D shows an enlarged cross section of the front plates of the battery and the USB assembly. The rear cell in a preferred embodiment is formed from an outer cylindrical shell 56 that forms the negative casing and is continuous to the rear negative plate on the battery, with a front crimping 40 that provides a means of supporting front plates mechanically and encasing an insulating ring 41 (e.g. of a rubber, cardboard or plastic material), a positive plate layer 42 that supports prong 43, a further insulating spacer 44 (e.g. cardboard) which separates the plate from the negative outer face plate 45, where the face plate 45 supports ridges, edges and shaping 46 to secure (e.g. by mechanical, welding or chemical means) the USB assembly 28 which is seen in cross-section to contain circuit board 29 with circuitry 30 on the underside and wrapped by moulded casing 53 which more clearly shows the recess 55 corresponding to indent 63 on the USB outer shell 31.

Figure 9A:
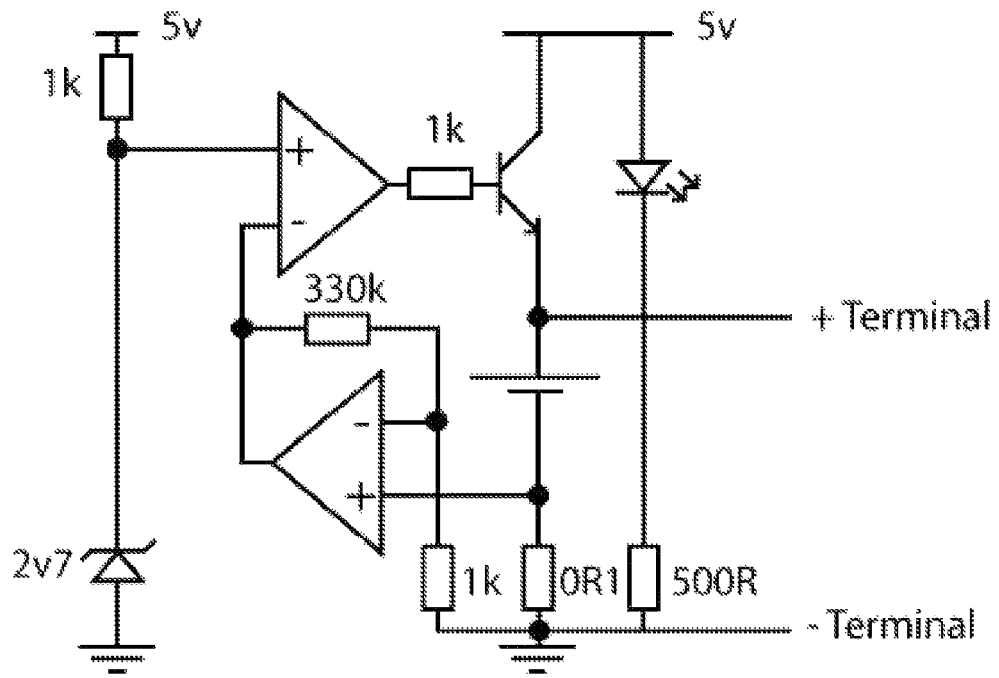
FIG. 9A shows an example embodiment of a simple recharging circuit for trickle charging.
Figure 9B:
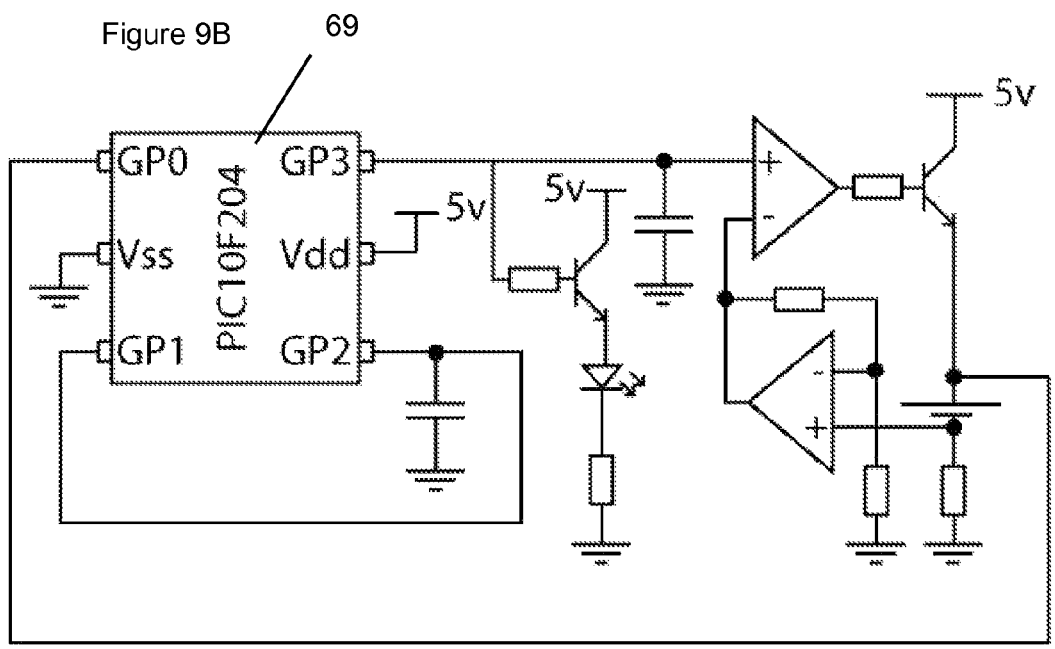
FIG. 9B shows an example preferred embodiment of a controlled recharging circuit.

FIG. 9A shows an example embodiment of a simple recharging circuit for performing trickle charging. In this example embodiment this is achieved through two op-amps and a transistor forming a constant current source, charging the battery. The voltage drop across the 0R1 sense resistor is amplified to determine the current being passed through the battery. The value of the current is determined by the gain in the lower op-amp stage when compared to the value of the 2v7 Zener voltage reference. An LED is lit when the battery is connected to a USB port. This example circuit charges the battery at 70 mA, but simple value changes of components allow it to work at any chosen current value up to the maximum available. FIG. 9B shows an example preferred embodiment of a circuit which includes end of charge detection, whereby the cell voltage is monitored by means of a microcontroller. In this example a compact 6 pin microcontroller compares an input GP0 connected to the positive battery terminal and comparator input GP2. A pulse width modulated (PWM) signal on GP2 will be filtered by the capacitor, to give a voltage level which can be altered by changing the duty cycle of the PWM signal. In this way it can work as a crude ADC (analogue to digital converter), to sense the battery voltage. The current supplied by the dual op-amp constant current source is controlled by pulse width modulating GP3 to produce a voltage reference. This circuit allows charging currents of at least several hundred milliamps. The PWM output from GP3 can also be used to make an LED illuminate when the battery is charging. When the battery has finished charging, the voltage reference to the comparing op-amp will need to be 0V, and therefore also turns off the LED.

FIGS. 10 to 12 shows further preferred AA embodiments.

FIG. 10 shows an AA embodiment 24 formed using a standard reduced length battery cell 25 with front face plate 42 being attached to a moulding 71 that supports the USB assembly 28 and also supports a split folding front cap 27 that opens in two halves. FIG. 10A shows the battery in the standard usage format. FIG. 10B shows the battery with front cap folded back in two halves 76 and 77 by means of hinges 78 attached to moulding 71 where moulding 71 is also seen to support the casing 53 forming the inner layer of the USB 28. FIG. 10C shows an exploded view of components. In this embodiment positive cap 35 supports an alternative shape of prong 52 and hook 51 that connects directly to a positive prong 61 on the USB assembly 29 circuit board and through to prong 74 for connection to the positive terminal which is the front face plate 42 and prong 75 similarly connecting to the negative outer shell 56. Moulding 71 both affixes the USB assembly 53 and connects to face plate 42 on the rear battery cell, which in this preferred embodiment is a standard rechargeable cell formed with a flat face plate.

FIG. 11 shows an AA embodiment 24 formed using a standard reduced length battery cell 25 with front face plate 42 supporting a USB assembly and also supporting a hinging front cap 27. FIG. 11A shows the primary sub-sections being a battery cell 25 a support moulding 71 and USB assembly 28 supporting integral circuitry with optional circuitry embedded within moulding 71. FIG. 11B shows the battery in the standard usage format with a side shaping and slot 70 in the front cap 27 to allow a simple fold to expose the USB assembly 28. FIG. 11C shows the battery 24 in the recharge configuration where front cap 27 has folded through approx 180 degrees to lie flat against the battery by means of hinge 73 and axle 72. FIG. 11D shows an exploded view of primary components and shows an alternative shaping of positive prong 52 that passes above the USB assembly 28 so that it does not prevent the cap folding and connects through a recess in moulding 71 to the positive face plate 42.

Figure 12A:
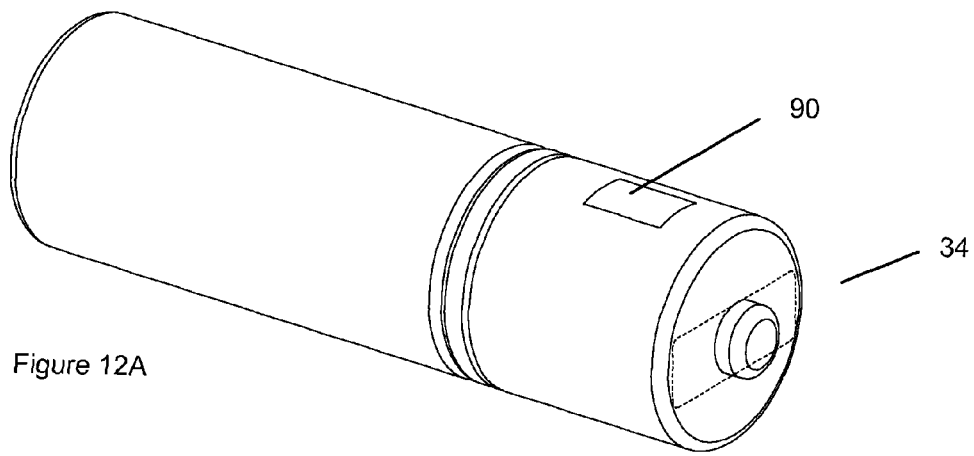
FIG. 12A shows the battery in the standard usage format.
Figure 12B:
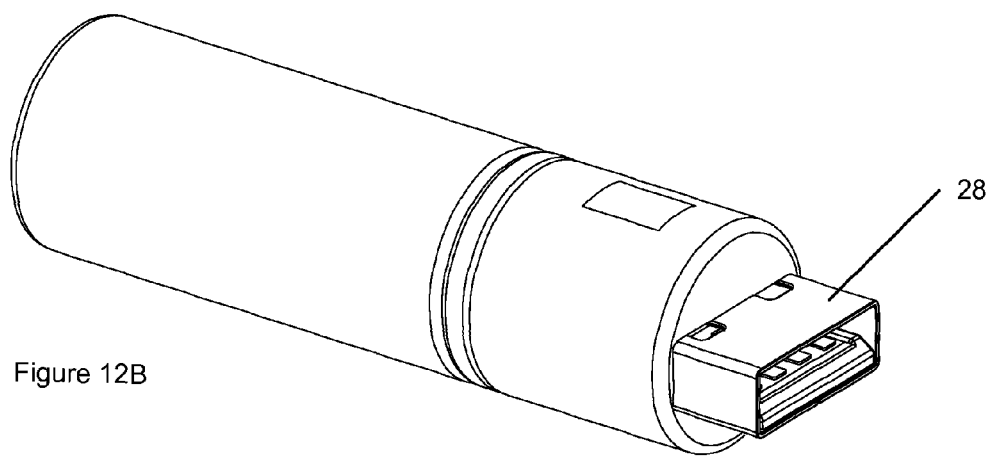
FIG. 12B in a half open format and FIG. 12C in the recharge configuration.
Figure 12C:
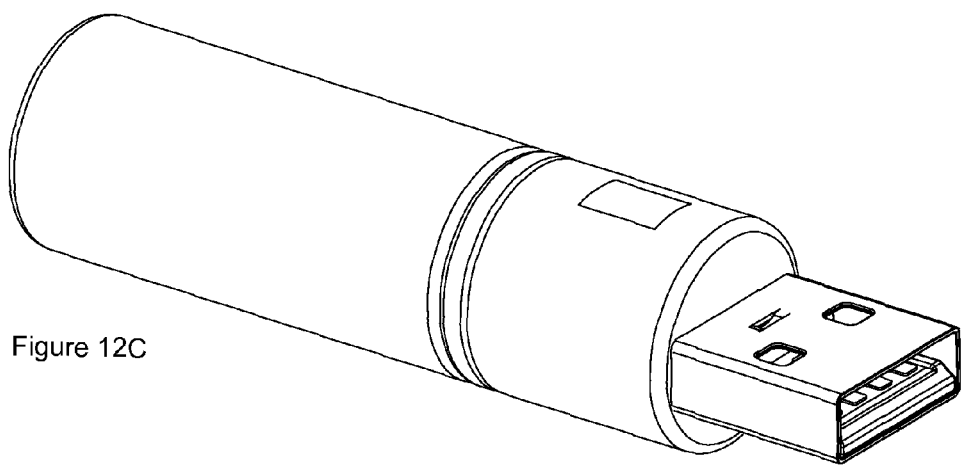
Figure 17B:
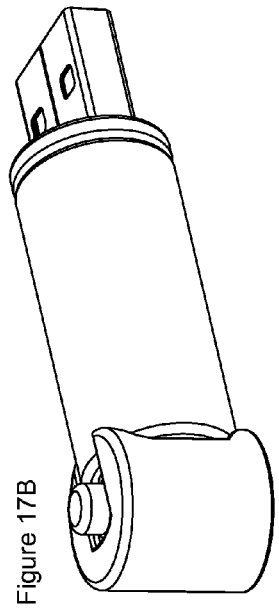
Figure 17C:
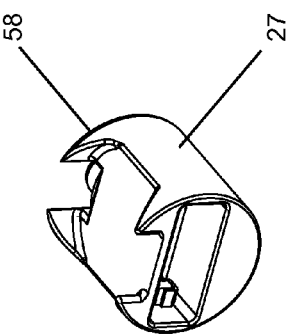
Figure 17D:
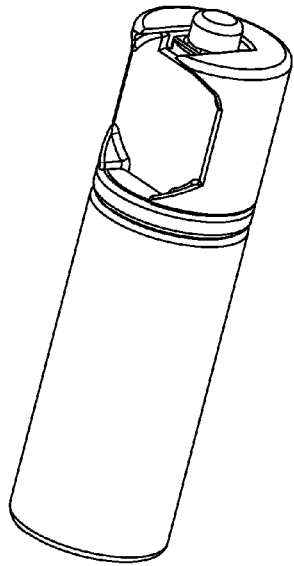
Figure 17A:
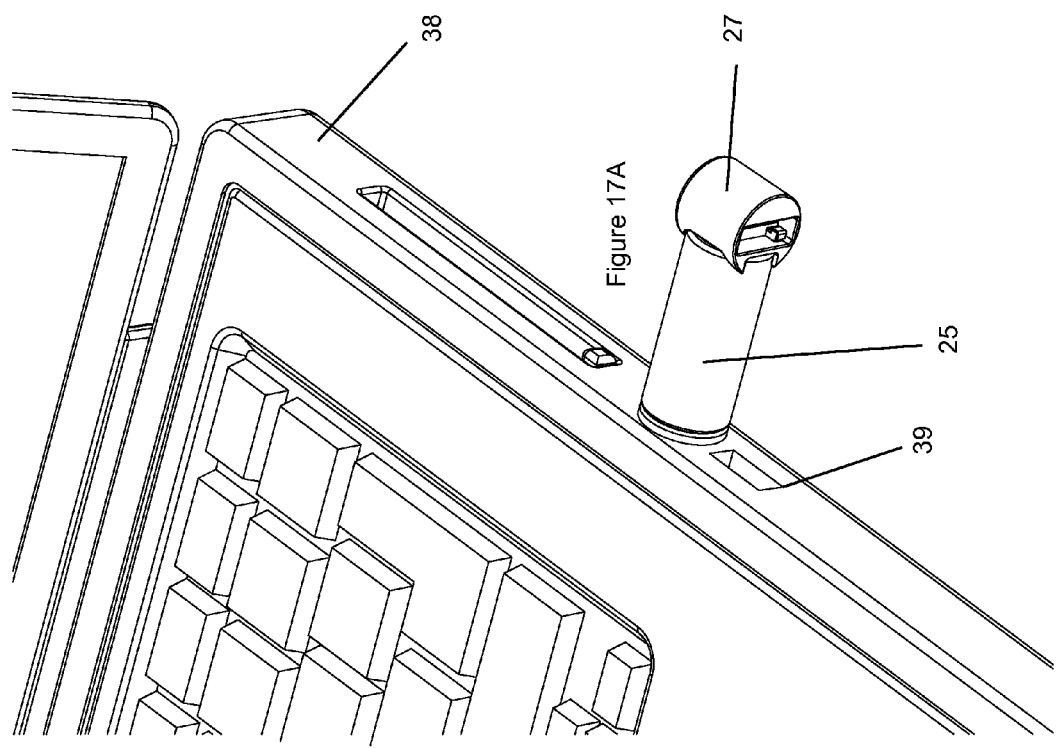
FIG. 17A shows an example of the battery with cap when recharging in a socket of a computer device, FIG. 17B the battery with front cap attached to the rear of the battery, FIG. 17C the cap mechanism and FIG. 17D the battery with front cap attached with the battery in the standard usage format.

FIG. 12 shows an AA embodiment 24 where the USB assembly 28 slides out of the battery cell in the recharging configuration which by way of example might be via a folding flap 34 and actuated by a release mechanism 90. FIG. 12A shows the battery in the standard usage format. FIG. 12B shows the battery in a half open format where the USB assembly 28 partially protrudes from the cell. FIG. 12C shows the battery in the recharge configuration where the USB assembly 28 is exposed for charging.

FIGS. 13 to 15 show further preferred AAA embodiments.

FIG. 13 shows an AAA embodiment 36 with a half folding USB connector 83 and hinged folding front cap 27. FIG. 13A shows an exploded view of components where moulding 71, which affixes to rear cell front plate 42, supports one half of the USB connector 83 that itself supports a flexible hinge 82 that joins both halves of the circuit board 83 and 84 together. Circuitry may be embedded under the circuit board and within the moulding 71. The hinge may be biased to prefer a flat open configuration such that the action of opening the front cap and hinging by means of hinge 73 and axle 72 enables the USB circuit to pop open as shown in FIG. 13D and FIG. 13E. The action of folding the front cap closed acts to lock the two halves of the USB folded. The positive prong 52 is suitably shaped to pass outside and underneath the USB plug. In this embodiment no external USB casing 31 is used with the deployed USB connector 83 and 84 being capable of insertion within a normal USB socket.

FIG. 14 shows an AAA embodiment 36 with bi-folding USB connector 80 with FIG. 14A showing the battery in the standard format usage state, FIG. 14B and FIG. 14C in a partially open state where side shaping 81 on the front of cap 27 act to push the folding USB sides 79 closed as the cap is closed. FIG. 14D shows the battery in a fully open recharge configuration state with front cap 27 folded back and the USB connector deployed supporting usual prongs 61. FIG. 14E shows an exploded view of the components where the collapsible USB assembly comprises a central casing 80 that supports a central circuit board 29 with usual positive and negative prongs 75 and 74, and supports at the sides flexible hinges 82 that hold side sections 79 each supporting a prong. Front positive plate 35 again supports a shaped prong 52 that passes through a recess in front cap 27 to connect with the positive plate 42.

FIG. 15 shows an AAA embodiment 36 with reduced mini-USB connector 86 and hinged folding front cap 27 with open recess 70 with FIG. 15A showing the battery in the standard format usage state, FIG. 15B in a partially open state and FIG. 15C in a fully open recharge configuration state with front cap 27 folded back. FIG. 15D shows an exploded view of components where notably support moulding 85 contains the circuitry 87 in recess 88 instead of embedding in the reduced connector 86. Front positive prong 52 passes through an appropriate recessed groove in the front cap 27 to connect with the positive plate 42.

FIGS. 16 to 19 show further preferred embodiments of attaching a removable front cap, shown as example on a preferred AA embodiment.

FIG. 16 shows a preferred embodiment of a front cap 27 that slides over the USB assembly 28 and has two folding sections 57 that enable the cap to be supported by affixing to the rear of the battery cell 25 when the battery is in the recharge state. FIG. 16A shows an example of the battery with cap when recharging in a socket 39 of a computer device. FIG. 16B shows the battery with front cap 27 attached to the rear of the battery. FIG. 16C shows the cap mechanism comprising a front cap with recess to slide over the USB assembly and two folding sections 57 with shaped internal surface that form a partial cylinder when open to enable the front cap 27 to be attached to the back cylinder of cell 25. FIG. 16D shows the battery with front cap 27 attached with the battery in the standard usage format.

FIG. 17 shows a preferred embodiment of a front cap 27 that slides over the USB assembly 28 and has an example shaped recess 58 that enables the cap to be supported by affixing to the rear of the battery when the battery is in the recharge state. FIG. 17A shows an example of the battery with cap 27 attached when recharging in a socket 39 of a computer device, FIG. 17B the battery with front cap 27 attached to the rear of the battery 25, FIG. 17C the cap recess 58 mechanism and FIG. 17D the battery with front cap attached with the battery in the standard usage format.

FIG. 18 shows a preferred embodiment of a front cap 27 that slides over the USB assembly 28 and has semi-flexible outer casing and magnetic means 59 that enable the cap to be supported by affixing to the rear of the battery 25 when the battery is in the recharge state. FIG. 18A shows an example of the battery with cap 27 attached when recharging in a socket 39 of a computer device. FIG. 18B shows the battery with front cap 27 attached to the rear of the battery 25. FIG. 18C shows the cap mechanism 59. FIG. 18D shows the battery with front cap 27 attached with the battery in the standard usage format.

Figure 19A:
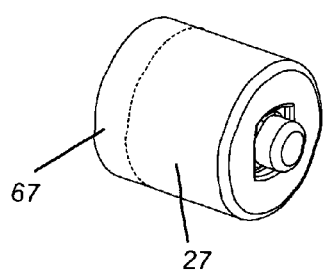
FIG. 19A shows a further example of a preferred embodiment of a front cap with a section acting as a flexible outer casing for affixing to the rear of the battery.
Figure 19B:
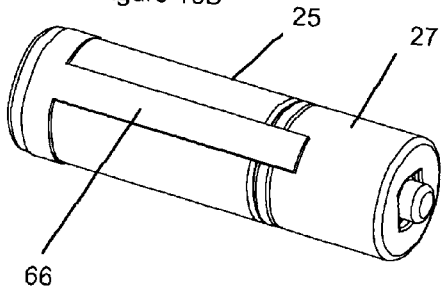
FIG. 19B shows an embodiment where the front cap is attached by means of an elastic strip.
Figure 19C:
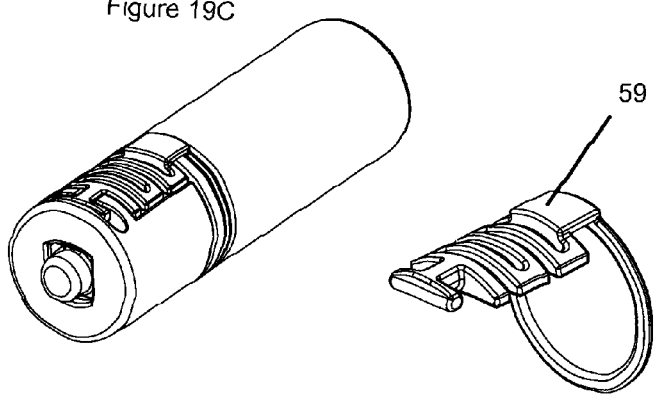
FIG. 19C and FIG. 19D show a further embodiment where the front cap is attached by means of a hinged spring embedded within the cap.
Figure 19D:
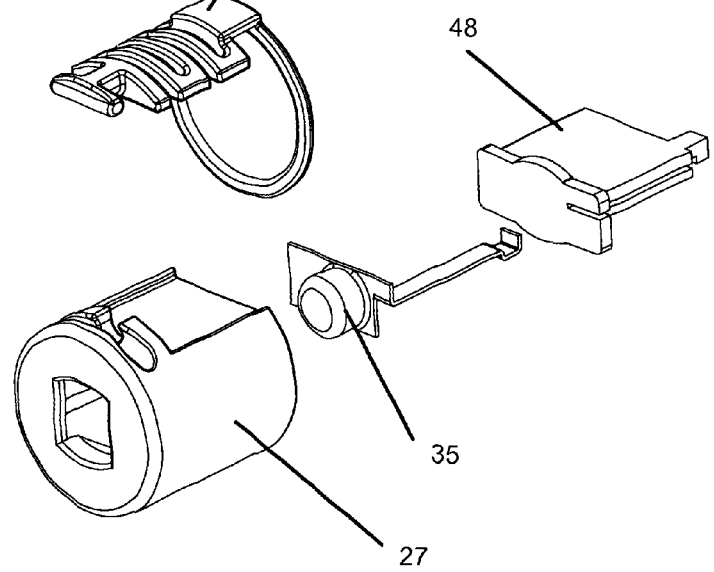

FIG. 19A shows a further example of a preferred embodiment of a front cap 27 with a section 67 acting as a flexible outer casing for affixing to the rear of the battery 25. FIG. 19B shows an embodiment where the front cap 27 is attached by means of an elastic strip 66. FIG. 19C and FIG. 19D show a further embodiment where the front cap 27 is attached by means of a hinged spring 59 embedded within the cap 27, where front cap 27 supports a recess or shaping to accommodate the flexible hinged spring 59.

FIG. 20 shows further preferred embodiments of the invention applied to other format batteries where in FIG. 20A a hinged USB assembly 65 folds out of a rectangular battery format 64, such as might be found as example in digital cameras or mobile phones, to provide an exposed USB assembly 65 (as shown in FIG. 20B) suitable for recharging. FIG. 20C and FIG. 20D show a further embodiment where the USB assembly 65 slides out of a recess in battery 64. FIG. 20E and FIG. 20F show a further embodiment where a USB assembly 65 slides out of a battery pack 91 comprising a regular format cell and reduced format cell with integral folding connector 24.

FIG. 21 shows example embodiments of methods of status and control information being displayed on a computing device 38 during recharging. FIG. 21A shows a cell charging icon 92 on a status bar 93 and a popped up information alert 94 that in a preferred embodiment provides information about the charging, environmental recycling information, promotional information. FIG. 21B shows a battery management software application 95 that could be a local application provided as a driver or download for providing advanced management and control functions for the battery, or could be a live website used for battery management or to procure further batteries. FIG. 21C shows an example of a pop up menu selection control panel 96 that could support functions to provide battery status, product purchase, problem resolution, promotion or recycling awareness.

A preferred embodiment of a rechargeable battery 25 according to the present invention is illustrated schematically in FIG. 21D, having circuitry which has a more advanced processor 100, such as a USB compliant microcontroller. The circuitry 30 contains a processor 100 in communication with a memory 99 (which is shown as embedded within said processor but may alternatively be separate) and a USB connector plug 28. The connector 28 contains prongs 61, through which connection can be made to an external device, such as the shown laptop computer 38. The laptop computer includes a processor 98, a display 97, and other standard components.

The memory has stored therein first and second software applications 95. The first software application is an application of the type known as a 'portable application'. The first software application is executable directly from the memory of the rechargeable battery on the processor of the laptop computer. Software applications of this type are known, e.g. from Portable Mozilla, Portable OpenOffice.org and the like. The first software application does not need to be installed onto the laptop computer to be executed thereon, although this is not precluded. Within the USB standard such an application may simply execute a process called Enumeration whereby a USB product identifier stored in memory 99 is passed to the USB host management software on the external device 38 to trigger an appropriate standard application or dedicated application that has been downloaded onto the external device for battery management.

Since some external devices, particularly those running Windows™ operating systems, may prevent such a portable application executing from the rechargeable battery, it may be necessary with these devices to install a software application that allows portable applications to be executed before the first software application will execute on the external device. A suitable application may be PStart, which is currently available at http://www.pegtop.net/start/.

The second software application is executable directly by the processor of the rechargeable battery. The second software application interacts with the first software application to pass relevant information and control signals between the rechargeable battery and the external device.

When the rechargeable battery is connected into a USB port 39 of the external device, following installation on the external device of a suitable software application if necessary, the first software application is automatically executed on the processor of the external device. The first software application provides additional functionality to the rechargeable battery as follows.

The first software application obtains information relating to the charging of the battery unit from the rechargeable battery, optionally with assistance from the second software application. The first software application uses this information to display an icon 92 (shown in FIG. 21A) on the display. The icon allows a user easily to determine how much charge is present in the battery unit. The icon may be similar to that currently found on some laptop computers and indicating the level of charge of an internal battery. The icon can pictorially represent the level of battery charge as a fraction of the maximum charge, or may represent the charge level textually. The icon may indicate whether the battery unit is currently being charged, optionally using animation in the icon.

The first software application when executed may be operable to provide a user interface, through which a user can interact with the first software application, on the external device. For instance, the user interface can allow the user to provide battery management controls, which are operable through the user interface. This may take the form of the software application 95 of FIG. 21B. The battery management controls can allow the user to determine the charging rate of the battery unit, for instance by selecting between a number of pre-set charging rates. This can allow the user to obtain rapid charging as the expense of potentially reduced battery life, or slower charging, which may increase battery life but at the expense of an increased time to reach a certain level of charge.

The interface may include a menu including selectable options, displayed on the external device, for example as the pop-up control panel 96 shown in FIG. 21C.

The first software application may control a browser application installed on the external device to access a remotely located resource such as a web page.

A record of the number of times that the rechargeable battery has been charged may be stored within the memory of the rechargeable battery. Here, each time that the first software application is executed, the first software application uploads the relevant information from the memory, optionally using the processor and the second software application, and updates the information at a suitable point in the charging process, for instance when charging is complete. In this way, the useful life of the rechargeable battery can be monitored by the battery itself.

When it is determined that the rechargeable battery is reaching the end of its normal life, for instance by determining that the number of recharges performed is greater than a threshold (for example, set at 90% of the number of recommended recharges before the rechargeable battery is replaced), the first software application makes this information available to the user through the user interface. Thus, the user knows that they should make arrangements for the rechargeable battery to be replaced. Advantageously, the rechargeable battery allows the user to source a replacement. This can occur in any suitable way. For instance, the first software application can, once it detects that the number of charges performed exceeds the threshold, cause a browser application of the external device to be directed to a website through which the user can order one or more replacement batteries for delivery by mail. Optionally, the first software application is arranged to carry this out every time that the rechargeable battery is subsequently charged until the first software application determines, either passively or through feedback from the relevant website, that the user has made an order for replacement batteries. This avoids the need for the user either to make an order on the first recharging occasion following the threshold being exceeded or to remember subsequently to make an order.

The first software application can also provide the user with information about recycling of the rechargeable battery. For instance, when it is determined that the battery has reached the end of its normal life, the first software application can execute a routine which causes instructions on how the rechargeable can be recycled to be displayed to the user. The recycling information can be stored in the memory, or can be accessed from a remote source, for instance using a browser application to access a web page. This information may be accompanied or replaced by promotional information.

The first software application may include instructions allowing problem resolution such as diagnostic tools or a web page resource.

The processor and the second software application are optional, and may be omitted. In some systems, it may be possible for the first software application to be executed instead on the processor of the rechargeable battery, and for no dedicated software application to be executed on the processor of the external device.

While preferred embodiments of this invention have been shown and described, modifications thereof can be made by one skilled in the art without departing from the scope of this invention. Accordingly, the scope of protection is not limited to the embodiments described herein, but is only limited by the claims that follow, the scope of which shall include all equivalents of the subject matter of the claims.

For example, although the present invention is described and illustrated principally with reference to embodiments supporting collapsible and rigid USB connectors, as AA, AAA format batteries and as a AA to AAA battery adaptor, it is expressly understood that it is in no way limited to the disclosure of such preferred embodiments, but is capable of numerous modifications within the scope of the claims. By way of further example, the battery device could be adapted with smaller rigid USB, Firewire or other emergent 'Bus' connector devices for electrical data and power recharging with computer devices, and/or with an alternative collapsing connector approach, such as utilization of a flexible prong connector. Similarly the present invention could be applied to larger format batteries. Furthermore, the present invention could be adapted to provide a more complex folding USB connector that could expand to act as a USB receptacle that could provide power to a USB peripheral via a USB connector. Similarly the folding USB sub-assembly could be used as a component in a general computer peripheral to reduce volume, such as in a data watch, portable mouse, or compact digital camera or music player.

The invention claimed is:

1. A rechargeable battery assembly, the battery assembly comprising:
   a rechargeable battery unit;
   a memory; and,
   a data and power connector plug;
   the battery assembly having a deployed configuration in which the battery assembly has the general form of and functions as a conventional battery format, and a recharge configuration in which the data and power connector plug is made accessible to enable said data and power connector plug to be connected to a suitable receptacle on a computing device for recharging of the battery and for allowing data to be sent from the memory to the computing device,
   wherein the memory stores a battery identifier that is communicated to the computing device through the data and power connector when the battery assembly is connected to said suitable receptacle on the computing device, the battery identifier being useable to provide to the user on the computing device
   marketing promotion,
   tailored to the battery assembly in accordance with the battery identifier.

2. A rechargeable battery assembly according to claim 1, wherein said data and power connector plug is a USB connector.

3. A rechargeable battery assembly according to claim 1, wherein the memory stores a software application.

4. A rechargeable battery assembly according to claim 3, wherein the software application when executed is operable to provide information concerning the battery and charging of the battery unit to a said computing device via the data and power connector plug.

5. A rechargeable battery assembly according to claim 4, wherein the software application when executed is operable to control a said computing device to display an icon representing the battery unit charging information.

6. A rechargeable battery assembly according to claim 4, wherein the battery unit charging information comprises at least one of charge level information and charging state information.

7. A rechargeable battery assembly according to claim 3, wherein the software application when executed is operable to provide a user interface on a said computing device, through which a user can interact with the software application.

8. A rechargeable battery assembly according to claim 7, wherein the software application when executed is operable to provide at least one battery management control on said computing device that is controllable through said user interface.

9. A rechargeable battery assembly according to claim 3, wherein the software application when executed is operable to provide a menu including selectable options on a said computing device.

10. A rechargeable battery assembly according to claim 3, wherein the software application when executed is operable to control a said computing device through the data and power connector plug to access a remotely located resource.

11. A rechargeable battery assembly according to claim 3, wherein the software application when executed is operable to provide the battery identifier information to a said computing device through the data and power connector plug.

12. A rechargeable battery assembly according to claim 11, wherein said battery identifier is a unique battery identifier.

13. A rechargeable battery assembly according to claim 3, comprising a processor for executing the software application.

14. A rechargeable battery assembly according to claim 1, comprising a cap for covering the data and power connector plug in the deployed configuration.

15. A rechargeable battery assembly according to claim 14, wherein the cap has a first terminal and the battery assembly has a second terminal to deliver current to a load connected between the first and second terminals.

16. A rechargeable battery assembly according to claim 1, wherein the battery assembly conventional battery format has an envelope, the data and power connector plug is constructed and arranged to be able to fold between a rigid form suitable for making a said connection when the battery assembly is in said recharge configuration, and a storage form suitable for being accommodated within the envelope of said battery assembly conventional battery format when the battery assembly is in said deployed configuration.

17. A rechargeable battery assembly according to claim 1, wherein the rechargeable battery unit is arranged so as to be capable of being recharged by using a conventional battery recharger and applying recharging current via terminals of the battery assembly rather than via said data and power connector plug.

18. A method of providing information to a user relating to a rechargeable battery assembly, the battery assembly comprising:

a rechargeable battery unit;
a memory; and,
a data and power connector plug;
the battery assembly having a deployed configuration in which the battery assembly has the general form of and functions as a conventional battery format, and a recharge configuration in which the data and power connector plug is made accessible to enable said data and power connector plug to be connected to a suitable receptacle on a computing device for recharging of the battery and for allowing data to be sent from the memory to the computing device, wherein the memory stores a battery identifier;
the method comprising:
connecting said data and power connector plug to a corresponding receiving connector of a computing device;
sending information about the rechargeable battery unit including at least the battery identifier to the computing device;
receiving said information by a software process running on said computing device; and,
providing to the user on the computing device marketing promotion
tailored to the battery assembly in accordance with the battery identifier.

19. A method according to claim 18 comprising:
sending information about the status or history of the rechargeable battery unit to the computing device;
receiving said information by a software process running on said computing device; and,
displaying a message by said software process on the screen of said computing device.

20. A method according to claim 18 comprising:
sending information about the status or history of the rechargeable battery unit to the computing device;
receiving said information by a software process running on said computing device; and,
sending secondary information relating to said information to another computing device across a network attached to said computing device.

* * * * *